United States Patent
Yamamoto

(10) Patent No.: US 10,001,992 B2
(45) Date of Patent: Jun. 19, 2018

(54) METHOD, INFORMATION PROCESSING APPARATUS, AND MEDIUM

(71) Applicant: FUJITSU LIMITED, Kawasaki-shi, Kanagawa (JP)

(72) Inventor: Masao Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 321 days.

(21) Appl. No.: 15/042,561

(22) Filed: Feb. 12, 2016

(65) Prior Publication Data

US 2016/0239298 A1 Aug. 18, 2016

(30) Foreign Application Priority Data

Feb. 17, 2015 (JP) ................................. 2015-028209

(51) Int. Cl.
G06F 9/30 (2018.01)
G06F 12/0875 (2016.01)

(52) U.S. Cl.
CPC ........ *G06F 9/3001* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| | | | |
|---|---|---|---|
| 5,671,402 A | 9/1997 | Nasu et al. | |
| 5,857,097 A | 1/1999 | Henzinger et al. | |
| 7,418,581 B2 * | 8/2008 | Chaudhry | G06F 9/3842 712/227 |
| 7,937,568 B2 * | 5/2011 | Correale, Jr. | G06F 1/08 712/221 |
| 8,448,140 B2 * | 5/2013 | Isshiki | G06F 11/3419 717/124 |
| 9,823,938 B2 * | 11/2017 | Venkatasubramanian | G06F 9/30 |

FOREIGN PATENT DOCUMENTS

| | | |
|---|---|---|
| JP | 7-334395 | 12/1995 |
| JP | 10-254739 | 9/1998 |

\* cited by examiner

*Primary Examiner* — Corey S Faherty
(74) *Attorney, Agent, or Firm* — Oblon, McClelland, Maier & Neustadt, L.L.P.

(57) ABSTRACT

A method includes: calculating a percentage of an instruction belonging to a certain instruction type among instruction types included in each of a plurality of blocks partitioned from a program; extracting an execution address and a number of execution instructions from an arithmetic processing unit that executes the program and performs sampling of the execution address and the number of execution instructions at a plurality of time points, calculating a first execution frequency of the instruction included in each of the plurality of blocks based on the extracted execution address and the number of execution instructions; calculating a second execution frequency of the instruction belonging to the instruction type by multiplying the first execution frequency of the block by the percentage of the instruction in the block; calculating total number of second execution frequencies calculated for each of the plurality of blocks.

18 Claims, 30 Drawing Sheets

FIG. 4

```
0x0400:    push    %rbp
0x0401:    push    %rbx
0x0402:    xor     %ebx,%ebx
0x0404:    sub     $0x68,%rsp
0x0408:    movl    $0x80,0xe667da8(%rip)
0x0412:    movl    $0x80,0xe667da2(%rip)
0x041c:    push    %rbx
0x041d:    jmp     0x0c13
```
⎫
⎬ 401
⎭

```
0x0420:    mov     %edi,-0x14(%rbp)
    .          .
    .          .
    .          .
0x0c13:    add     %eax,-0x14(%rbp)
0x0c16:    leaveq
0x0c17:    retq
```

FIG. 5

| BASIC BLOCK NUMBER | RANGE (START ADDRESS TO END ADDRESS) |
|---|---|
| 1 | 0x0400-0x041F |
| 2 | 0x0420-0x044F |
| 3 | 0x0450-0x04FF |
| 4 | 0x0500-0x057F |
| ⋮ | ⋮ |
| TOTAL | 0x0400-0xFFFF |

FIG. 6

| INTEGER ARITHMETIC | FLOATING-POINT ARITHMETIC | BRANCH INSTRUCTION | LOAD OR STORE | TOTAL |
|---|---|---|---|---|
| 2 | 0 | 1 | 5 | 8 |

FIG. 7

| BASIC BLOCK NUMBER | PERCENTAGE OF INSTRUCTION TYPE (%) | | | |
| --- | --- | --- | --- | --- |
| | INTEGER ARITHMETIC | FLOATING-POINT ARITHMETIC | BRANCH INSTRUCTION | LOAD OR STORE |
| 1 | 25.0 | 0.0 | 12.5 | 62.5 |
| 2 | 25.0 | 60.0 | 5.0 | 10.0 |
| 3 | 3.3 | 66.7 | 3.3 | 26.7 |
| 4 | 20.0 | 0.0 | 20.0 | 60.0 |
| ⋮ | ⋮ | ⋮ | ⋮ | ⋮ |

FIG. 13

| CPU NUMBER | PROCESS ID | EXECUTION ADDRESS | NUMBER OF EXECUTION INSTRUCTIONS |
|---|---|---|---|
| 0 | 6612 | 0x0405 | 312007 |
| 0 | 6612 | 0x04C8 | 313390 |
| 0 | 6612 | 0x0C13 | 307356 |
| ⋮ | ⋮ | ⋮ | ⋮ |

FIG. 16

| BASIC BLOCK NUMBER | FIRST EXECUTION FREQUENCY |
|---|---|
| 1 | 1,000,000,000 |
| 2 | 2,000,000,000 |
| 3 | 3,000,000,000 |
| 4 | 100,000,000 |
| ⋮ | ⋮ |
| TOTAL | 50,000,000,000 |

FIG. 17

| BASIC BLOCK NUMBER | SECOND EXECUTION FREQUENCY | | | |
|---|---|---|---|---|
| | INTEGER ARITHMETIC | FLOATING-POINT ARITHMETIC | BRANCH INSTRUCTION | LOAD OR STORE |
| 1 | 250,000,000 | 0 | 125,000,000 | 625,000,000 |
| 2 | 500,000,000 | 1,200,000,000 | 100,000,000 | 200,000,000 |
| 3 | 100,000,000 | 2,000,000,000 | 100,000,000 | 800,000,000 |
| 4 | 20,000,000 | 0 | 20,000,000 | 60,000,000 |
| ⋮ | ⋮ | ⋮ | ⋮ | ⋮ |

FIG. 18

| BASIC BLOCK NUMBER | THIRD EXECUTION FREQUENCY ||||
|---|---|---|---|---|
| | INTEGER ARITHMETIC | FLOATING-POINT ARITHMETIC | BRANCH INSTRUCTION | LOAD OR STORE |
| TOTAL | 5,000,000,000 | 20,000,000,000 | 10,000,000,000 | 15,000,000,000 |

FIG. 26

| BASIC BLOCK NUMBER | PERCENTAGE OF INSTRUCTION TYPES (%) | |
|---|---|---|
| | FLOATING-POINT ARITHMETIC | OTHER |
| 1 | 0.0 | 100.0 |
| 2 | 60.0 | 40.0 |
| 3 | 66.7 | 33.3 |
| 4 | 0.0 | 100.0 |
| ⋮ | ⋮ | ⋮ |

FIG. 27

| BASIC BLOCK NUMBER | PERCENTAGE OF INSTRUCTION TYPES (%) | |
| --- | --- | --- |
| | FLOATING-POINT ARITHMETIC | OTHER |
| 1 | 0 | 1,000,000,000 |
| 2 | 1,200,000,000 | 800,000,000 |
| 3 | 2,000,000,000 | 1,000,000,000 |
| 4 | 0 | 100,000,000 |
| ⋮ | ⋮ | ⋮ |

FIG. 28

| BASIC BLOCK NUMBER | PERCENTAGE OF INSTRUCTION TYPES (%) ||
|---|---|---|
| | FLOATING-POINT ARITHMETIC | OTHER |
| TOTAL | 20,000,000,000 | 30,000,000,000 |

METHOD, INFORMATION PROCESSING APPARATUS, AND MEDIUM

CROSS-REFERENCE TO RELATED APPLICATION

This application is based upon and claims the benefit of priority of the prior Japanese Patent Application No. 2015-028209, filed on Feb. 17, 2015, the entire contents of which are incorporated herein by reference.

FIELD

The embodiments discussed herein are related to a technique for measuring the performance of an arithmetic processing unit.

BACKGROUND

The number of performance events can be counted when using a performance monitoring counter provided in a central processing unit (CPU). For example, when the execution of an instruction is counted as a performance event, the total number of instructions executed by the CPU can be obtained. The total number of instructions executed is useful as an index for indicating the performance of the CPU.

The performance of a CPU can also be measured by trace or simulation methods. However, these measurements may impose a greater load on the CPU that is running the programs to be measured.

Japanese Laid-open Patent Publication No. 10-254739 and Japanese Laid-open Patent Publication No. 07-334395 are known as examples of prior art.

SUMMARY

According to an aspect of the invention, a method includes: calculating, by a processor, a percentage of an instruction belonging to a certain instruction type among instruction types included in a block, the block being one of a plurality of blocks partitioned from a program; extracting an execution address and a number of execution instructions from an arithmetic processing unit that executes the program and performs sampling of the execution address and the number of execution instructions at a plurality of time points, the number of execution instructions indicating number of instructions executed after precedent time point; calculating, by the processor, a first execution frequency of the instruction included in the block in each of the plurality of blocks based on the extracted execution address and the number of execution instructions; calculating, by the processor, a second execution frequency of the instruction belonging to the instruction type by multiplying the first execution frequency of the block by the percentage of the instruction in the block; calculating, by the processor, total number of second execution frequencies calculated for each of the plurality of blocks; and storing the calculated total number of the second execution frequencies to a memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a reverse assembly code;
FIG. 5 illustrates an example of a block map;
FIG. 6 illustrates an example of parameters in a parameter storage unit;
FIG. 7 illustrates an example of percentage data;
FIG. 13 illustrates an example of sample data;
FIG. 16 illustrates an example of first data;
FIG. 17 illustrates an example of second data;
FIG. 18 illustrates an example of result data;
FIG. 26 illustrates an example of percentage data according to a fourth embodiment;
FIG. 27 illustrates an example of second data according to the fourth embodiment;
FIG. 28 illustrates an example of result data according to the fourth embodiment.

DESCRIPTION OF EMBODIMENTS

First Embodiment

One aspect of the present embodiment is to count the number of executions of instructions belonging to certain instruction types in an arithmetic processing unit while maintaining a low load. A method for calculating the number of executions for each type of instruction by a CPU for executing execution programs will be explained in the present embodiment.

Figure 1:
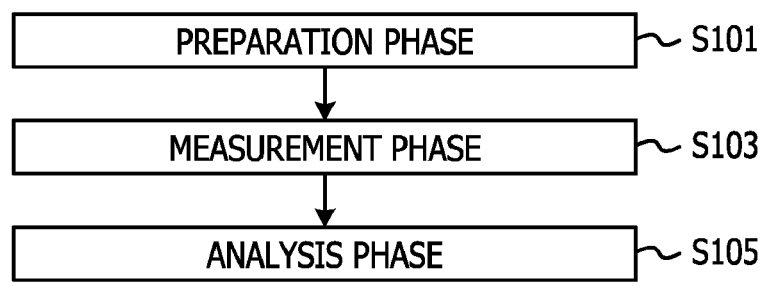
FIG. 1 illustrates phases.

FIG. 1 illustrates phases in the present embodiment. Processing in the present embodiment is divided into three phases. A preparation phase (S101) involves preparing for an analysis phase. A measurement phase (S103) involves causing the CPU to execute an execution program and carrying out sampling. The analysis phase (S105) involves analyzing the samples obtained by the sampling. Details of the phases are explained below.

The three phases may not be carried out consecutively. That is, the processing of the preparation phase (S101) and the processing of the measurement phase (S103) may not be executed consecutively. Further, the processing of the measurement phase (S103) and the processing of the analysis phase (S105) may not be executed consecutively.

While FIG. 1 illustrates an example of executing the processing in the order of the preparation phase (S101), the measurement phase (S103), and the analysis phase (S105), the processing may also be executed in the order of the measurement phase (S103), the preparation phase (S101), and the analysis phase (S105). That is, the processing of the preparation phase (S101) and the processing of the measurement phase (S103) may be executed before the execution of the processing of the analysis phase (S105).

Figure 2:
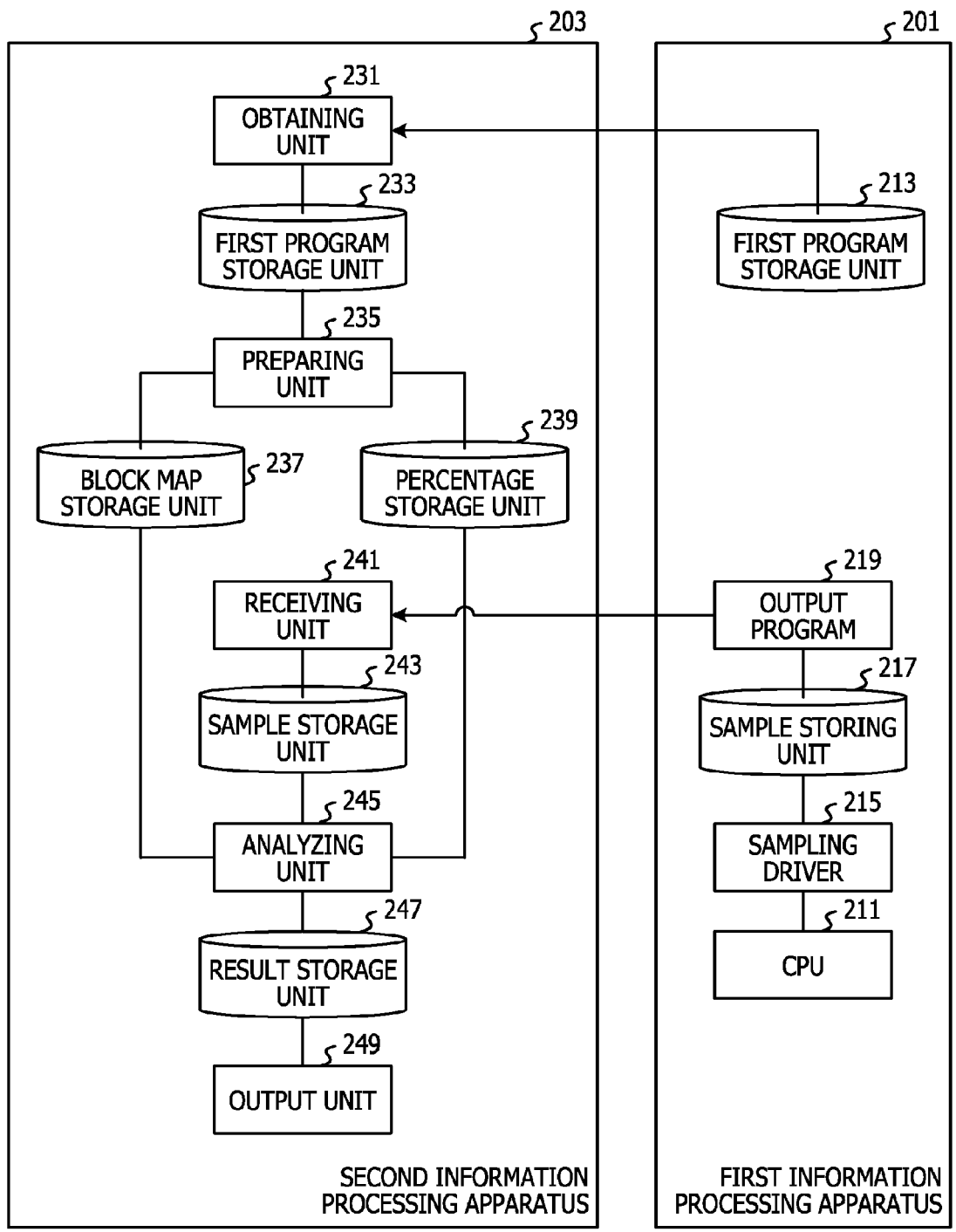
FIG. 2 illustrates an example of a module configuration of a first information processing apparatus and a second information processing apparatus.

A module configuration of an information processing apparatus according to the present embodiment the present embodiment will be explained next. FIG. 2 illustrates an example of a module configuration of a first information processing apparatus 201 and a second information processing apparatus 203. Two information processing apparatuses are used in the example illustrated in FIG. 2. The first information processing apparatus 201 executes processing of the measurement phase (S103). The first information processing apparatus 201 corresponds to the operating environment of an execution program for example. The second information processing apparatus 203 executes processing of the preparation phase (S101) and processing of the analysis phase (S105). The second information processing apparatus 203 corresponds to an analysis device for example.

If the second information processing apparatus 203 corresponding to the analysis device is provided separately from the first information processing apparatus 201 corresponding to the operating environment of the execution program, the processing load on the first information processing apparatus 201 can be reduced.

Moreover, the second information processing apparatus 203 may batch and analyze sample data from a plurality of the first information processing apparatuses 201. For example, the first information processing apparatus 201 may be a server device connected to a local area network (LAN). Furthermore, the second information processing apparatus 203 may be a management device connected to the LAN.

The first information processing apparatus 201 and the second information processing apparatus 203 may also be connected to a network other than a LAN such as the Internet for example. If the first information processing apparatus 201 and the second information processing apparatus 203 are connected to the Internet, operating conditions of the first information processing apparatus 201 can be understood by the second information processing apparatus 203 provided in a remote site.

Additionally, the first information processing apparatus 201 may also operate as the second information processing apparatus 203. That is, the processing of the preparation phase (S101), the processing of the measurement phase (S103), and the processing of the analysis phase (S105) may be executed by one information processing apparatus. An embodiment with one information processing apparatus is explained in the fifth embodiment.

The first information processing apparatus 201 has a CPU 211, a first program storage unit 213, a sampling driver 215, a sample storing unit 217, and an output program 219. The CPU 211 carries out performance monitoring. The first program storage unit 213 stores an execution program to be analyzed. The sampling driver 215 carries out sampling processing. The sample storing unit 217 stores obtained sample data. The output program 219 outputs the sample data.

The second information processing apparatus 203 has an obtaining unit 231, a first program storage unit 233, a preparing unit 235, a block map storage unit 237, a percentage storage unit 239, a receiving unit 241, a sample storage unit 243, an analyzing unit 245, a result storage unit 247, and an output unit 249. The obtaining unit 231 obtains an execution program to be analyzed. The first program storage unit 233 stores the execution program to be analyzed. The first program storage unit 233 in the second information processing apparatus 203 is the same as the first program storage unit 213 in the first information processing apparatus 201. The preparing unit 235 carries out the processing in the preparation phase (S101). The block map storage unit 237 stores a block map in which the ranges of basic blocks in an execution program are set. The percentage storage unit 239 stores data (referred to below as "percentage data") of percentages of instructions belonging to the instruction types of a basic block. The receiving unit 241 receives the sample data. The sample storage unit 243 stores the sample data. The analyzing unit 245 carries out the processing in the analysis phase (S105). The result storage unit 247 stores the result data of the analysis. The output unit 249 outputs the result data.

The abovementioned obtaining unit 231, the preparing unit 235, the receiving unit 241, the analyzing unit 245, and the output unit 249 are realized by using hardware resources (e.g., FIG. 30) and programs that cause a processor to execute the following processing.

Figure 30:
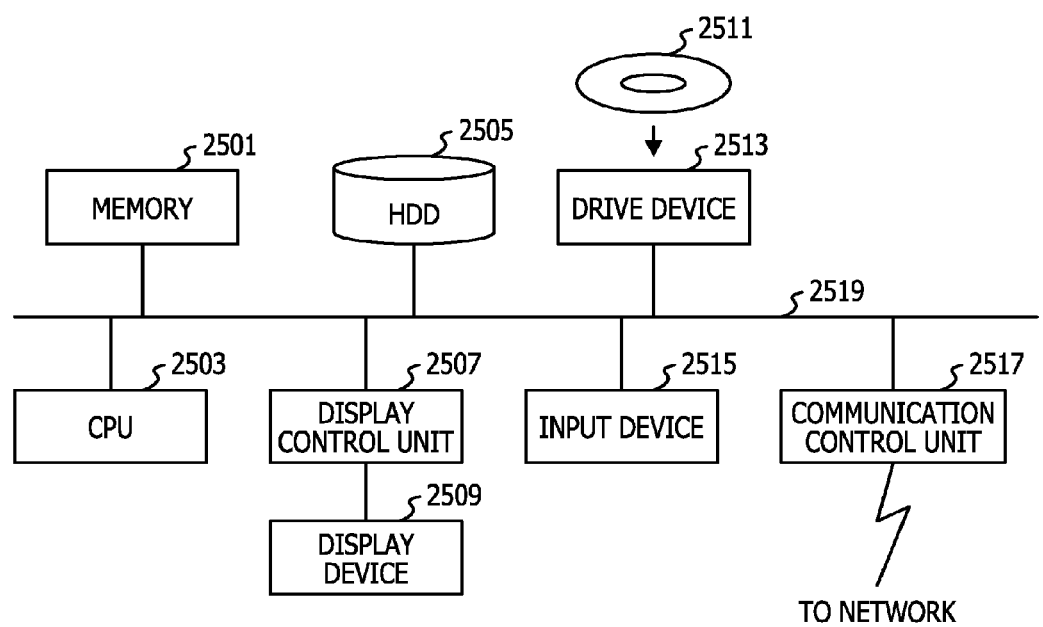
FIG. 30 is a functional block diagram of a computer.

The abovementioned first program storage unit 213, the sample storing unit 217, the first program storage unit 233, the block map storage unit 237, the percentage storage unit 239, the sample storage unit 243, and the result storage unit 247 are realized by using hardware resources (e.g., FIG. 30).

Figure 3:
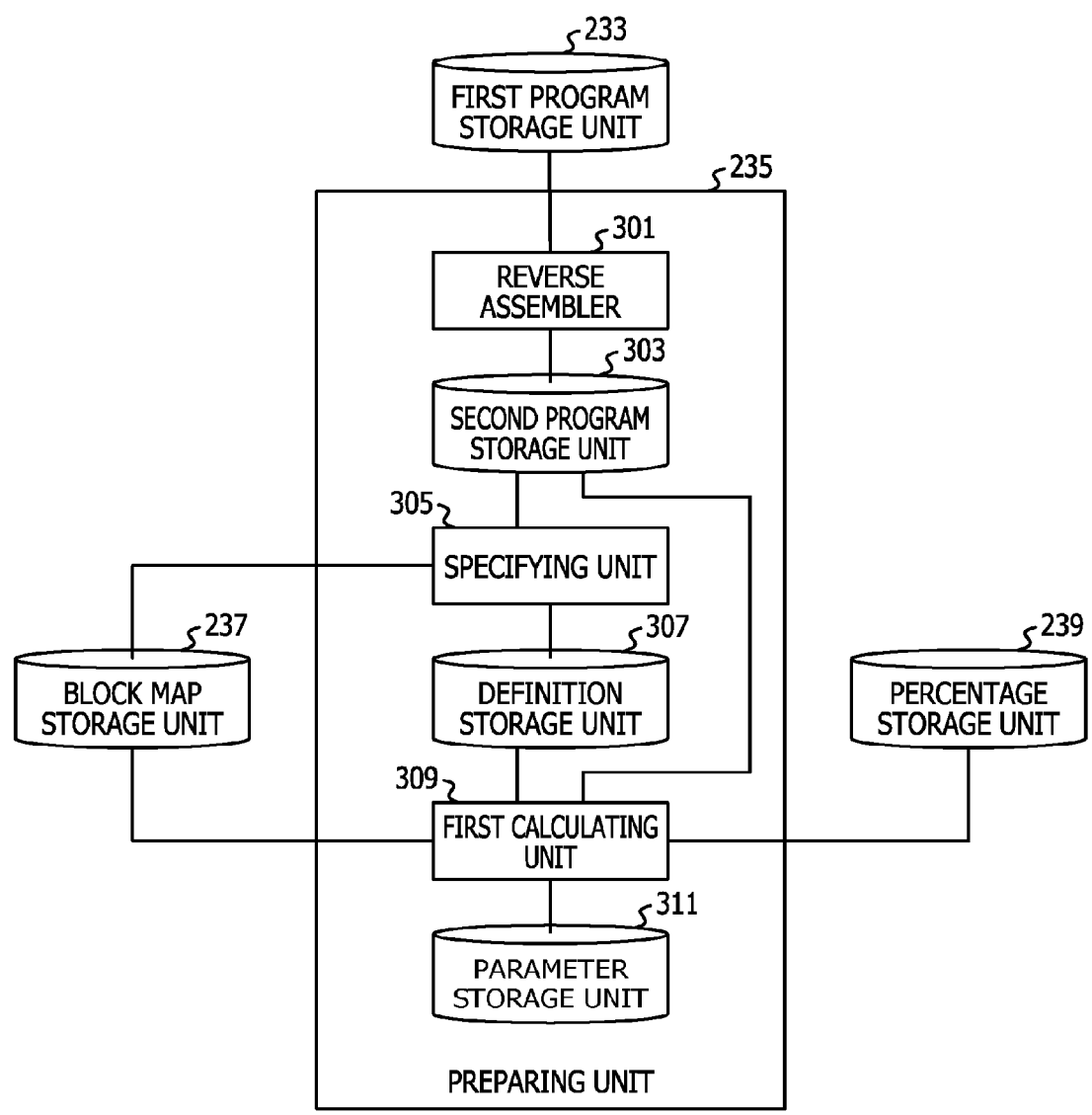
FIG. 3 illustrates an example of a module configuration of a preparing unit.

The preparation phase (S101) will be explained next. FIG. 3 illustrates an example of a module configuration of the preparing unit 235. The preparing unit 235 has a reverse assembler 301, a second program storage unit 303, a specifying unit 305, a definition storage unit 307, a first calculating unit 309, and a parameter storage unit 311. The reverse assembler 301 converts an execution program, that is, an object code based on a machine language, to a source code described in an assembly language. The converted source code described in the assembly language is referred to below as a reverse assembly code. The reverse assembly code is also a type of program.

The second program storage unit 303 stores the reverse assembly code. The specifying unit 305 executes specification processing. The specifying unit 305 divides the reverse assembly code and specifies a plurality of basic blocks in the specification processing. The definition storage unit 307 stores instructions in association with the type of instruction to which each instruction belongs. The first calculating unit 309 executes first calculation processing. The first calculating unit 309 calculates the percentage occupied by the instructions belonging to each instruction type in each basic block in the first calculation processing. The parameter storage unit 311 stores various types of parameters.

The abovementioned reverse assembler 301, the specifying unit 305, and the first calculating unit 309 are realized by using hardware resources (e.g., FIG. 30) and programs that cause a processor to execute the processing described below.

The abovementioned second program storage unit 303, the definition storage unit 307, and the parameter storage unit 311 are realized by using hardware resources (e.g., FIG. 30).

The reverse assembly code will be explained next. FIG. 4 illustrates an example of the reverse assembly code. The strings on the left side represent addresses for indicating an instruction. The strings in the center represent instructions. The strings on the right side represent objects.

A frame 401 encloses the first basic block. A branch instruction ("jmp" in this example) is in the last line of the basic block; however, no other branch instructions are present in the basic block. Therefore, the instructions included in the basic block are executed successively. That is, the number of executions of the individual instructions included in the basic block is equal to the number of executions in the basic block itself. The second and subsequent basic blocks are the same. The reverse assembly code is understood as a series of a plurality of basic blocks.

A block map will be explained next. FIG. 5 illustrates an example of a block map. The block map in the example is in the format of a table. However, the block map may be in another format other than a table.

The block map in the example has a block record corresponding to the basic block. The block record of the block map has a field for setting basic block numbers and a field for setting ranges of the basic blocks. The basic block numbers identify the basic blocks. In this example, a number for each basic block is applied in order from the top. The range of a basic block is specified according to a start address and an end address.

The first block record in the example indicates that the first basic block occupies a range from address "0x0400" to address "0x041F". As mentioned above, the first basic block is the basic block enclosed in the frame 401 in FIG. 4.

Similarly, the second block record indicates that the second basic block occupies a range from address "0x0420" to address "0x044F".

Similarly, the third block record indicates that the third basic block occupies a range from address "0x0450" to address "0x04FF".

Similarly, the fourth block record indicates that the fourth basic block occupies a range from address "0x0500" to address "0x057F".

The reverse assembly code in the example occupies the entire range from "0x0400" to "0xFFFF".

Parameters in the parameter storage unit 311 will be explained next. FIG. 6 illustrates an example of parameters in the parameter storage unit 311. The parameters illustrated in FIG. 6 are used for classifying the instructions included in the basic blocks into instruction types and for counting the number of instructions for each instruction type. Furthermore, the parameters are used for counting the total number of instructions included in the basic block. The example depicts the values of the parameters when the instructions included in the first basic block enclosed by the frame 401 in FIG. 4 are classified.

The example in FIG. 6 indicates that the first basic block has two instructions belonging to an "integer arithmetic" instruction type. The example in FIG. 6 indicates that the first basic block has no instructions belonging to a "floating-point arithmetic" instruction type. The example in FIG. 6 indicates that the first basic block has one instruction belonging to a "branch instruction" instruction type. The example in FIG. 6 indicates that the first basic block has five instructions belonging to a "load or store" instruction type. Moreover, the example in FIG. 6 indicates that the first basic block has eight instructions in total.

The percentage data stored in the percentage storage unit 239 will be explained next. FIG. 7 illustrates an example of percentage data. The percentage data in this example is depicted in the format of a table. However, the percentage data may be in another format other than a table format.

The percentage data in the example has block records corresponding to the basic blocks. The block records of the percentage data include a field for setting basic block numbers and a field for setting the percentages of instructions belonging to each instruction type in the basic block.

The first block record in the example indicates that the percent of instructions belonging to the "integer arithmetic" instruction type in the first basic block is 25.0 percent. Similarly, the first block record in the example indicates that the percent of instructions belonging to the "floating-point arithmetic" instruction type in the first basic block is 0.0 percent. Similarly, the first block record in the example indicates that the percent of instructions belonging to the "branch instruction" instruction type in the first basic block is 12.5 percent. Similarly, the first block record in the example indicates that the percent of instructions belonging to the "load or store" instruction type in the first basic block is 62.5 percent.

The second block record in the example indicates that the percent of instructions belonging to the "integer arithmetic" instruction type in the second basic block is 25.0 percent. Similarly, the second block record in the example indicates that the percent of instructions belonging to the "floating-point arithmetic" instruction type in the second basic block is 60.0 percent. Similarly, the second block record in the example indicates that the percent of instructions belonging to the "branch instruction" instruction type in the second basic block is 5.0 percent. Similarly, the second block record in the example indicates that the percent of instructions belonging to the "load or store" instruction type in the second basic block is 10.0 percent.

The third block record in the example indicates that the percent of instructions belonging to the "integer arithmetic" instruction type in the third basic block is 3.3 percent. Similarly, the third block record in the example indicates that the percent of instructions belonging to the "floating-point arithmetic" instruction type in the third basic block is 66.7 percent. Similarly, the third block record in the example indicates that the percent of instructions belonging to the "branch instruction" instruction type in the third basic block is 3.3 percent. Similarly, the third block record in the example indicates that the percent of instructions belonging to the "load or store" instruction type in the third basic block is 26.7 percent. Decimal places at or below the second decimal place are omitted in this example.

The fourth block record in the example indicates that the percent of instructions belonging to the "integer arithmetic" instruction type in the fourth basic block is 20.0 percent. Similarly, the fourth block record in the example indicates that the percent of instructions belonging to the "floating-point arithmetic" instruction type in the fourth basic block is 0.0 percent. Similarly, the fourth block record in the example indicates that the percent of instructions belonging to the "branch instruction" instruction type in the fourth basic block is 20.0 percent. Similarly, the fourth block record in the example indicates that the percent of instructions belonging to the "load or store" instruction type in the fourth basic block is 60.0 percent.

Figure 8:
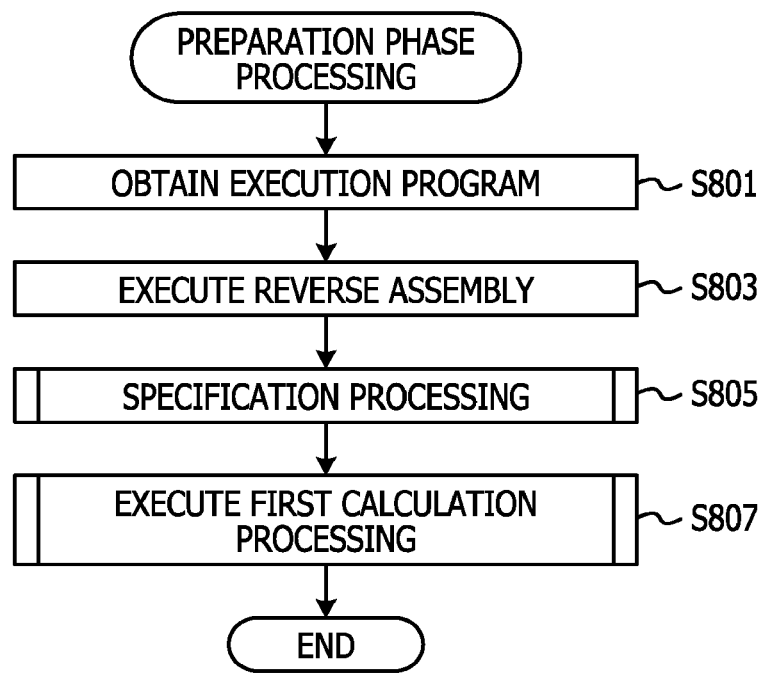
FIG. 8 illustrates an example of a processing flow for a preparation phase.

The discussion of the preparation phase (S101) is continued. FIG. 8 illustrates an example of a processing flow for the preparation phase (S101). The obtaining unit 231 obtains an execution program from the first program storage unit 213 in the first information processing apparatus 201 (S801). The obtaining unit 231 then stores the obtained execution program in the first program storage unit 233. The execution program is a machine language program, that is, an object code. The execution program may be called an object program or a target program.

The reverse assembler 301 executes a reverse assembly on the execution program stored in the first program storage unit 233 (S803). The reverse assembler 301 stores the reverse assembly code (e.g., FIG. 4) obtained from the reverse assembly, that is, the source code of the assembly language, in the second program storage unit 303.

The specifying unit 305 executes the specification processing (S805). The specifying unit 305 partitions the reverse assembly code and specifies a plurality of basic blocks in the specification processing. Specifically, the specifying unit 305 creates the abovementioned block map (e.g., FIG. 5).

Figure 9:
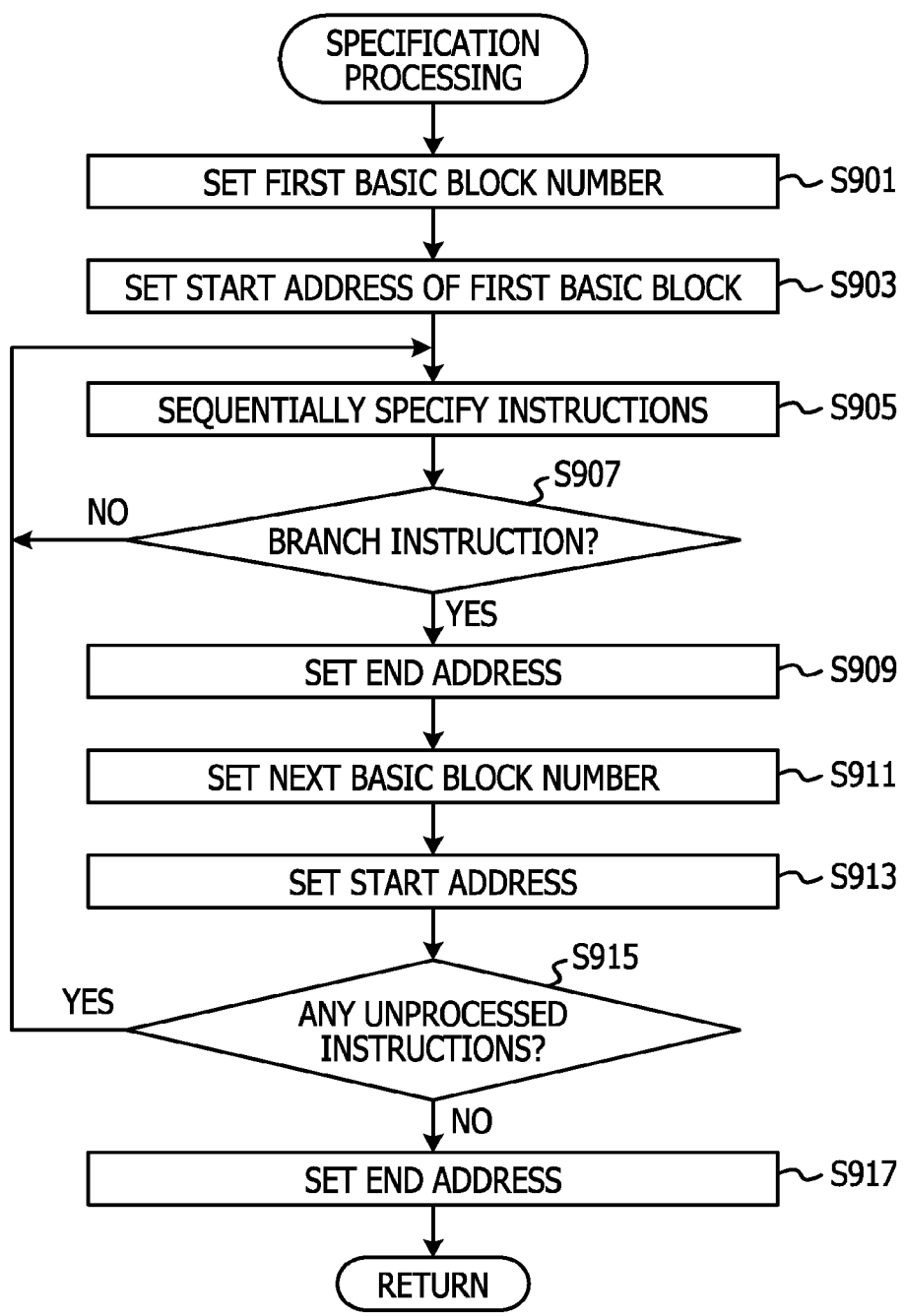
FIG. 9 illustrates a specification processing flow.

The specification processing will be explained next. FIG. 9 illustrates an example of the specification processing flow. The specifying unit 305 sets the first basic block number ("1" in this example) in the first block record of the block map (S901). The specifying unit 305 sets the start address of the first basic block (S903). Specifically, the specifying unit 305 sets the initial address ("0x0400" in the example in FIG. 4) of the reverse assembly code to the start address of the first block record.

The specifying unit 305 sequentially specifies the instructions in the reverse assembly code (S905). The specifying unit 305 determines whether a specified instruction corresponds to a branch instruction (e.g., "jmp") (S907). If it is determined that the specified instruction does not correspond to a branch instruction, the end of the basic block has not been reached and the processing returns to S905 to specify the next instruction.

If it is determined that a specified instruction corresponds to a branch instruction, the end of the basic block has been reached and the specifying unit 305 sets an end address corresponding to the start address set in S903 or the start address set in the following S913 (S909). The end address is derived, for example, by removing "1" from the address of the instruction located next to the instruction specified in S905. In the case of the basic block enclosed in the frame 401 in FIG. 4, "0x041F" as depicted in the first block record in FIG. 5 is the end address.

The specifying unit 305 proceeds next to the block record processing. The specifying unit 305 sets the next basic block number to the next block record (S911). The next basic block number is determined, for example, by adding "1" to the current basic block number.

The specifying unit 305 sets the address of the instruction located next to the instruction specified in S905 as the start address of the next block record (S913). The start address is "0x0420" as indicated by the second block record in FIG. 5 in the case of the basic block located next to the basic block enclosed in the frame 401 in FIG. 4.

The specifying unit 305 determines if there is an unprocessed instruction (S915). If it is determined that there is an unprocessed instruction, the end of the reverse assembly code has not been reached and the routine returns to the processing indicated in S905 and repeats the abovementioned processing.

If however it is determined that there are no unprocessed instructions, the end of the reverse assembly code has been reached and thus the specifying unit 305 sets the end address corresponding to the start address set in S913 (S917). The final address of the reverse assembly code is set to the end address at this time. The routine returns to the processing in S807 indicated in FIG. 8 when the specification processing is completed.

The explanation now returns to FIG. 8. The first calculating unit 309 executes first calculation processing (S807). The first calculating unit 309 calculates the percentage occupied by the instructions belonging to each instruction type in each basic block in the first calculation processing. Specifically, the first calculating unit 309 creates the abovementioned percentage data (e.g., FIG. 7).

Figure 10:
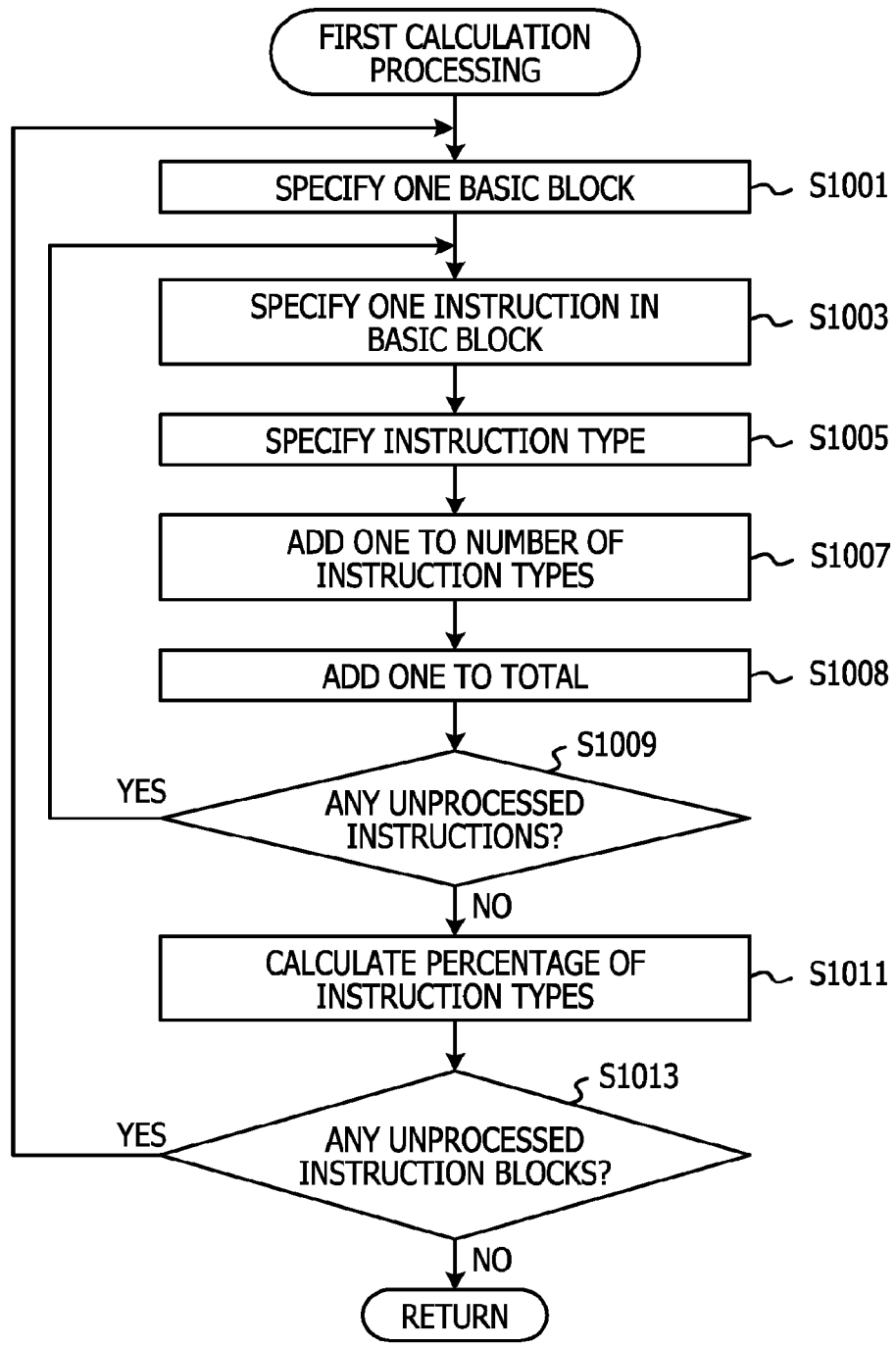
FIG. 10 illustrates an example of a first calculation processing flow.

The first calculation processing will be explained next. FIG. 10 illustrates an example of the first calculation processing flow. The first calculating unit 309 specifies one basic block (S1001). Specifically, the first calculating unit 309 sequentially specifies the block records in the block map (e.g., FIG. 5) from the top.

The instructions in the basic block are classified into various instruction types in the following processing. The first calculating unit 309 specifies one instruction in the basic block (S1003). Specifically, the first calculating unit 309 sequentially reads the instructions from the reverse assembly code according to the start address set in the block record specified in S1001.

The first calculating unit 309 specifies the instruction type to which the instruction specified in S1003 belongs (S1005). In this example, the first calculating unit 309 reads the instruction types associated with the instructions in the definition storage unit 307. For example, the instruction type "load or store" is specified for the initial instruction "push" in the case of the basic block enclosed in the frame 401 in FIG. 4.

The first calculating unit 309 adds one to the number of instructions belonging to the instruction type specified in S1005 (S1007). Specifically, the first calculating unit 309 adds one to the value of the parameter of the instruction type set in the parameter storage unit 311. The first calculating unit 309 furthermore adds one to the value of the total number of parameters set in the parameter storage unit 311 (S1008).

The first calculating unit 309 determines if there is an unprocessed instruction in the basic block specified in S1001 (S1009). If it is determined that there is an unprocessed instruction in the basic block specified in S1001, the classification of the instructions in the basic block has not been finished and the routine returns to S1003 and the abovementioned processing is repeated.

If it is determined however that there are no unprocessed instructions in the basic block specified in S1001, the classification of the instructions in the basic block is completed. For example, when the classification of the instructions in the first basic block enclosed in the frame 401 in FIG. 4 is completed, the parameters of the instruction type appears as the state depicted in FIG. 6.

The first calculating unit 309 calculates the percentages of the instruction types based on the number of instructions of the instruction types and the total number of instructions (S1011). Specifically, the first calculating unit 309 derives the percentages of the instruction types by dividing the number of instructions of the instruction type (parameter value of the instruction type) by the total number of instructions (parameter value of the total number). The calculated percentage of instruction types is set in the block record in the percentage data.

The percentage of the "integer arithmetic" instruction type is the value "25.0" (percent) which is two divided by eight as depicted in the first block record in the percentage data depicted in FIG. 7 in the case of the first basic block enclosed by the frame 401 in FIG. 4. Similarly, the percentage of the "floating-point arithmetic" instruction type is "0.0" (percent) which is zero divided by eight. Similarly, the percentage of the "branch instruction" instruction type is "12.5" (percent) which is one divided by eight. Similarly, the percentage of the "load or store" instruction type is "62.5" (percent) which is five divided by eight.

The first calculating unit 309 determines if there is an unprocessed basic block (S1013). If it is determined that there is an unprocessed basic block, the routine returns to the processing indicated in S1001 and repeats the abovementioned processing.

Conversely, if it is determined that there are no unprocessed basic blocks, the percentages of the instruction types of the basic blocks have been calculated entirely and the first calculation processing is completed. When the first calculation processing is completed, the preparation phase (S101) processing depicted in FIG. 8 is completed. The explanation of the preparation phase (S101) is now finished.

The measurement phase (S103) will be explained next. An example in which processing or a program is automatically activated by a control program and then stopped will be explained next. However, the activation and stoppage of the processing or the program may also be instructed manually by a user.

Figure 11:
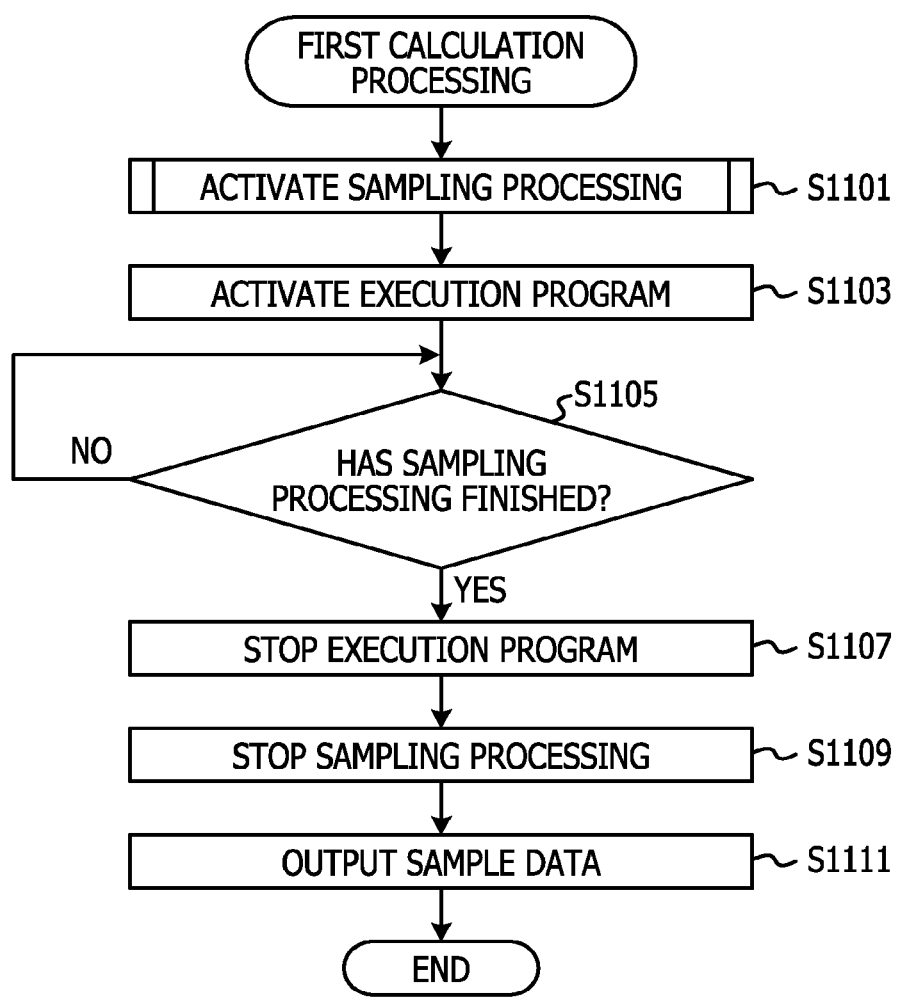
FIG. 11 illustrates an example of a processing flow for a measurement phase.

FIG. 11 illustrates an example of a processing flow for the measurement phase (S103). A control program activates sampling processing by the sampling driver 215 (S1101). The processing in S1101 may be omitted if the sampling processing by the sampling driver 215 is activated during boot processing of the first information processing apparatus 201. Moreover, the sampling processing by the sampling driver 215 may be activated manually as mentioned above. The sampling processing is explained using FIG. 14.

The control program then activates the execution program stored in the first program storage unit 213 (S1103). When the operation of the execution program loaded into the main memory is started, the sampling driver 215 continuously stores, in the sample storing unit 217, sample data obtained accompanying the operation of the execution program. The execution program is operated as a process. Further, the instructions included in the execution program are expanded according to the block map. If the execution program is already being operated, the processing in S1103 may be omitted.

The control program determines whether the sampling processing is finished (S1105). Any condition may be used for determining whether the sampling processing is finished. For example, the sampling processing may be finished at a point in time when a prescribed time period has elapsed after the activation of the execution program. Alternatively, if the execution program is a program for carrying out statistical calculations, the sampling processing may be finished at the point in time when a calculation pertaining to a prescribed problem is finished. Alternatively, if the execution program is a program for supporting a work task, the sampling processing may be finished at the point in time prescribed transaction processing is finished.

If it is determined that the sampling processing is not finished, the control program repeats the processing in S1105 and continues the sampling processing in this manner.

However, if it is determined that the sampling processing is finished, the control program stops the execution program (S1107). The processing in S1107 may be omitted if the execution program stops itself. Moreover, the execution program may not be stopped according to the operating conditions for example.

The control program stops the sampling processing by the sampling driver 215 (S1109). However, if there is no concern that the sample data in the sample storing unit 217 may be destructed, the sampling processing may not be stopped.

The output program 219 reads and outputs the sample data from the sample storing unit 217 (S1111). The sample data is explained below using FIG. 13. The output program 219 may transmit the sample data to the receiving unit 241 of the second information processing apparatus 203 via a network (e.g., a LAN or the Internet). The output program 219 may write the sample data on a recording medium. Further, the output program 219 may first temporarily save the sample data stored in the sample storing unit 217 and then output the sample data. The sample data is used in the analysis phase (S105). The processing of the measurement phase (S103) is finished when the sample data is outputted.

S1111 may be omitted if the measurement phase (S103) and the analysis phase (S105) are executed in the same information processing apparatus as described in a below-mentioned embodiment.

Figure 12:
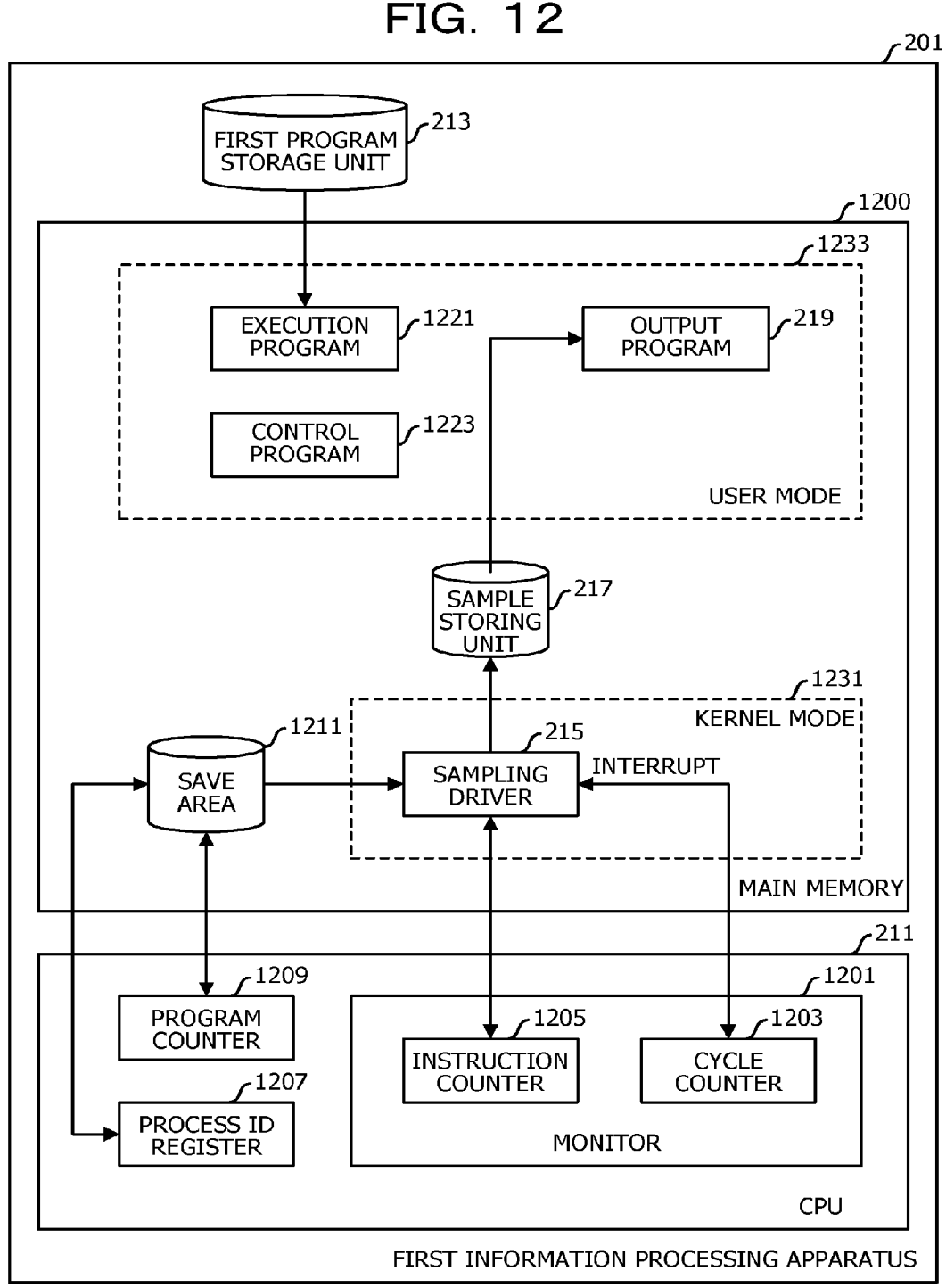
FIG. 12 illustrates an example of a module configuration of the first information processing apparatus.

Details of a module configuration of the first information processing apparatus 201 and the sample data will be explained before discussing the sampling processing. FIG. 12 illustrates an example of a module configuration of the first information processing apparatus 201. The CPU 211 of the first information processing apparatus 201 has a monitor 1201, a process ID register 1207, and a program counter 1209. The monitor 1201 executes performance monitoring. That is, the monitor 1201 monitors the set performance event (referred to as event below) and uses a performance monitoring counter to count the number of times an event occurs. In this example, the monitor 1201 counts cycle events and execution instruction events. A cycle counter 1203 in FIG. 12 indicates the performance monitoring counter for counting cycle events. An instruction counter 1205 in FIG. 12 indicates the performance monitoring counter for counting execution instruction events. The process ID register 1207 is a register for storing process IDs. The program counter 1209 is a register for storing execution addresses. Interruptions by the cycle counter 1203 are explained below.

A main memory 1200 in the first information processing apparatus 201 has loaded therein the sampling driver 215, the output program 219, an execution program 1221, and a control program 1223. The sampling driver 215 operates in a kernel mode 1231. The output program 219, the execution program 1221, and the control program 1223 operate in a user mode 1233. The execution program 1221 is read from the first program storage unit 213. The control program 1223 controls the processing in the measurement phase (S103). However, the control program 1223 may not be provided if the processing in the measurement phase (S103) is controlled by user operations.

Furthermore, the sample storing unit 217 and a save area 1211 are provided in the main memory 1200. The save area 1211 is used for saving data pertaining to the operations of the execution program 1221 from the CPU 211. The first program storage unit 213 is realized by using, for example, a hard disk drive.

The sample data stored in the sample storing unit 217 will be explained next. FIG. 13 illustrates an example of sample data. The sample data in this example is depicted in the format of a table. However, the sample data may be in another format other than a table format. The sample data in the example include sample codes corresponding to one extraction. Each sample code has a field for setting a CPU number, a field for setting a process ID, a field for setting an execution address, and a field for setting a number of execution instructions. The CPU number identifies the CPU performing the monitoring. The CPU number may be omitted if the CPU performing the monitoring is decided ahead of time. The process ID identifies the process being operated at the time of the sample extraction. The execution address points to the instruction being executed by the CPU at the time of the sample extraction. The number of execution instructions is the total number of the instructions executed by the CPU from the point in time of the previous sample extraction to the point in time of the current sample extraction.

A first sample code in the example indicates that the process identified by process ID "6612" was being operated at the point in time of the first sample extraction due to monitoring by the CPU corresponding to the CPU number "0". Similarly, the first sample code indicates that the instruction indicated by the execution address "0x0405" was being executed at the point in time of the first sample extraction. Similarly, the first sample code indicates that a running total of "312,007" instructions were executed from the point in time of starting the sampling until the point in time of the first sample extraction.

A second sample code in the example indicates that the process identified by process ID "6612" was being operated at the point in time of the second sample extraction due to monitoring by the CPU corresponding to the CPU number "0" in the same way as in the case of the first sample code. Similarly, the second sample code indicates that the instruction indicated by the execution address "0x04C8" was being executed at the point in time of the second sample extraction. Similarly, the second sample code indicates that a running total of "313,390" instructions were executed from the point in time of the first sample extraction until the point in time of the second sample extraction.

A third sample code in the example indicates that the process identified by process ID "6612" was being operated at the point in time of the third sample extraction due to monitoring by the CPU corresponding to the CPU number "0" in the same way as in the case of the first sample code and the second sample code. Similarly, the third sample code indicates that the instruction indicated by the execution address "0x0C13" was being executed at the point in time of the third sample extraction. Similarly, the second sample code indicates that a running total of "307,356" instructions were executed from the point in time of the second sample extraction until the point in time of the third sample extraction.

Figure 14:
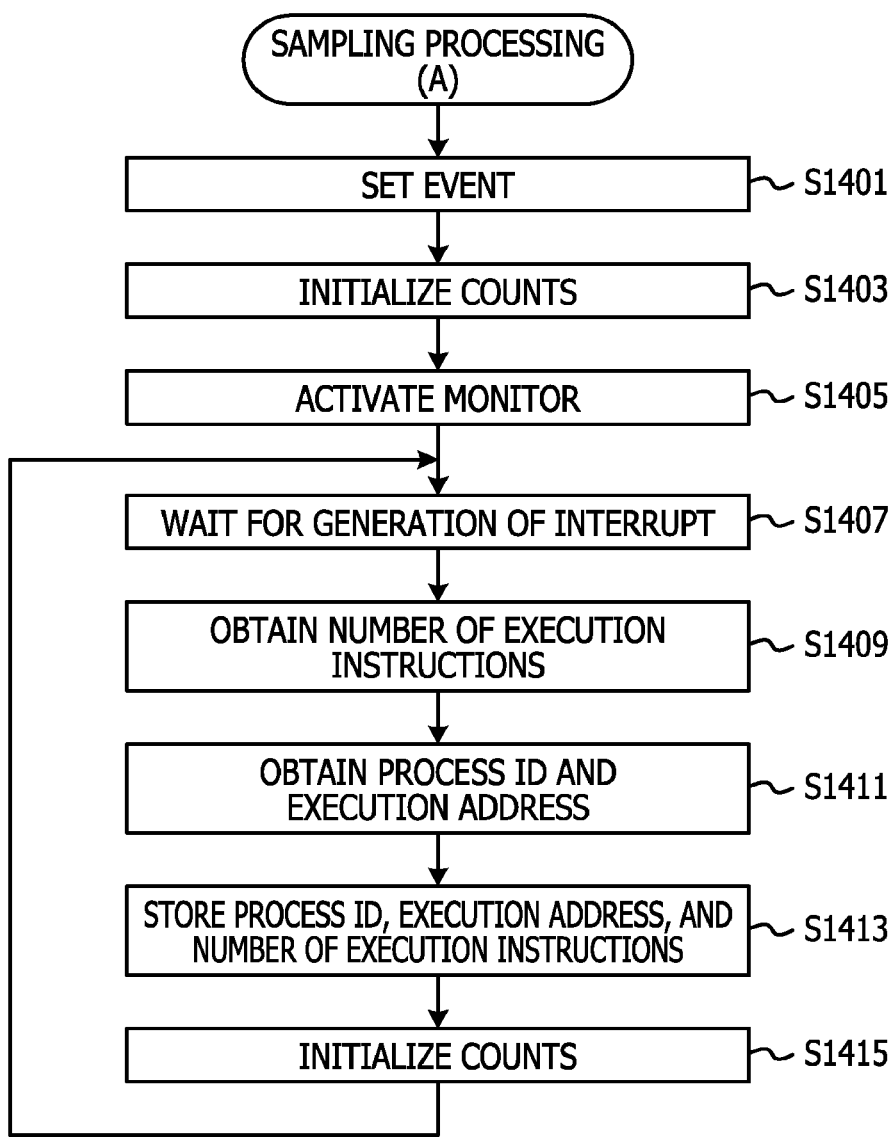
FIG. 14 illustrates an example of a flow of sampling processing (A)

In the present embodiment, a sampling processing (A) is executed assuming the example of the module configuration of the first information processing apparatus 201 depicted in FIG. 12. FIG. 14 illustrates an example of a flow of sampling processing (A). The sampling driver 215 sets an event in the monitor 1201 (S1401). In this example, the sampling driver 215 sets a cycle event and an execution instruction event. In this way, the number of cycles is counted by one of the performance monitoring counters in the monitor 1201. The cycle counter 1203 depicted in FIG. 12 corresponds to this performance monitoring counter. Further, the number of execution instructions is counted by the other performance monitoring counter in the monitor 1201. The instruction counter 1205 depicted in FIG. 12 corresponds to this performance monitoring counter.

Sampling based on the number of cycles, that is, time-based sampling is performed in the present embodiment. Sampling based on the number of cycles involves samples being extracted when the increase in the number of cycles reaches a predetermined value.

The sampling driver 215 initializes the cycle counter 1203 and the instruction counter 1205 (S1403). The cycle counter 1203 is used for measuring the timing of extracting samples by the sampling driver 215. As a result, the initial value of the cycle counter 1203 is set so that the cycle counter 1203 overflows when the number of cycles reaches the predetermined number. An interruption of the sampling driver 215 is generated when the cycle counter 1203 overflows. Samples are extracted upon the generation of the interruptions. The initial value of the instruction counter 1205 is zero. By making the initial value of the instruction counter 1205 zero in this way, the number of instructions executed until the next sample extraction is recorded in the sample storing unit 217.

The sampling driver 215 activates the monitor 1201 (S1405). The processing of S1405 may be omitted if the monitor 1201 is already activated.

The sampling driver 215 waits until the generation of an interruption due to the overflow of the cycle counter 1203 (S1407). When an interruption due to the overflow of the cycle counter 1203 is generated, the operation of the execution program 1221 is suspended whereby the CPU 211 saves data pertaining to the operation of the execution program 1221 in the save area 1211. In this example, the value of the program counter 1209 and the value of the process ID register 1207 are saved in the save area 1211 provided in the main memory 1200. The value of the program counter 1209 is the execution address indicating the instruction being executed at the point in time the interruption was generated. The value of the process ID register 1207 is the ID of the process being executed at the point in time the interruption was generated.

Next, the operation of the sampling driver 215 is switched. The sampling driver 215 obtains the number of execution instructions from the instruction counter 1205 (S1409). The number of execution instructions is the total number of instructions executed by the CPU 211 during the period from the point in time that the previous samples were extracted until the point in time of the current extraction of the samples.

The sampling driver 215 obtains the process ID and the execution address from the save area 1211 (S1411). The process ID "6612" depicted in FIG. 13 is an identifier of the process of the execution program 1221.

The sampling driver 215 stores the process ID, the execution address, and the number of execution instructions in a new sample code of the sample data (S1413). The CPU number "0" depicted in FIG. 13 indicates the CPU 211.

The sampling driver 215 initializes the cycle counter 1203 and the instruction counter 1205 in the same way as in S1403 (S1415). At this stage, the CPU 211 recovers the data pertaining to the operation of the execution program 1221 from the save area 1211 and the routine returns to the operation of the execution program 1221.

The sampling driver 215 returns to the processing indicated in S1407 and waits until the generation of the next interruption. In this way, the processing from S107 to S1415 is repeated until the sampling processing is stopped. The explanation of the measurement phase (S103) is finished.

Figure 15:
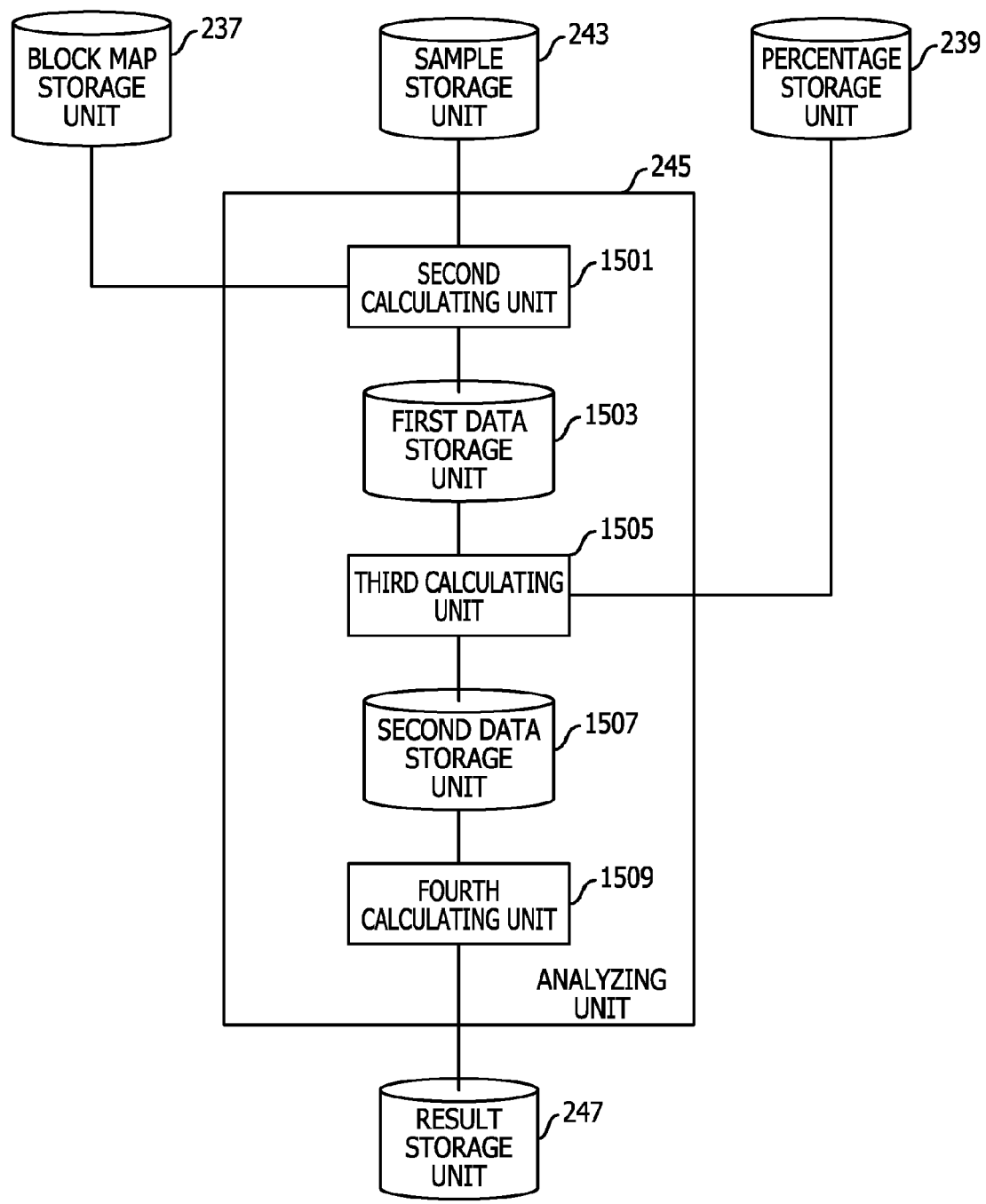
FIG. 15 illustrates an example of a module configuration of an analyzing unit.

The analysis phase (S105) will be explained next. FIG. 15 illustrates an example of a module configuration of the analyzing unit 245. The analyzing unit 245 has a second calculating unit 1501, a first data storage unit 1503, a third calculating unit 1505, a second data storage unit 1507, and a fourth calculating unit 1509.

The second calculating unit 1501 executes second calculation processing. The second calculating unit 1501 calculates the frequency (referred to below as first execution frequency) of the execution of the instructions included in each basic block during a sampling period based on the sample data and the block map in the second calculation processing. The first data storage unit 1503 stores data (referred to below as first data) of the first execution frequency. The first data is explained below using FIG. 16.

The third calculating unit 1505 executes third calculation processing. The third calculating unit 1505 calculates the frequency (referred to below as second execution frequency) of the executions of instructions belonging to each instruction type in the basic block by multiplying the first execution frequency in the basic block by the percentage accounted for by the instructions belonging to each instruction type in the basic block in the third calculation processing. The second data storage unit 1507 stores data (referred to below as second data) of the second execution frequency. The second data is explained below using FIG. 17.

The fourth calculating unit 1509 executes fourth calculation processing. The fourth calculating unit 1509 calculates the total of the second execution frequency in each basic block for each instruction type in the fourth calculation processing. The calculated total of the second execution frequency is stored in the result storage unit 247 as result data. The result data is explained below using FIG. 18.

The abovementioned second calculating unit 1501, the third calculating unit 1505, and the fourth calculating unit 1509 are realized by using hardware resources (e.g., FIG. 30) and programs that cause a processor to execute the following processing.

The abovementioned first data storage unit 1503 and the second data storage unit 1507 are realized by using hardware resources (e.g., FIG. 30).

The first data is explained next. FIG. 16 illustrates an example of the first data. The first data in this example is depicted in the format of a table. However, the first data may be in another format other than a table format.

The first data in the example has block records corresponding to the basic blocks. The block records of the first data include a field for setting basic block numbers and a field for setting the first execution frequency. As mentioned above, the first execution frequency is a running frequency of the execution of instructions included in the basic block during the sampling period. The first execution frequency is an estimated value and not an actual measurement value. However, the first execution frequency is considered to approximate the actual measurement values from a statistical perspective. The object counted in the first execution frequency is the execution of unspecified instructions included in the basic block. That is, the execution of an instruction belonging to any instruction type is counted in the first execution frequency.

The first block record in the example indicates that instructions included in the first basic block were executed a running total of "1,000,000,000" times. Similarly, the second block record in the example indicates that instructions included in the second basic block were executed a running total of "2,000,000,000" times. Similarly, the third block record in the example indicates that instructions included in the third basic block were executed a running total of "3,000,000,000" times. Similarly, the fourth block record in the example indicates that instructions included in the fourth basic block were executed a running total of "100,000,000" times. The running total of the first execution frequency in the basic blocks is "50,000,000,000". That is, the total number of instructions executed by the CPU 211 during the sampling period according to the operation of the execution program 1221 is "50,000,000,000".

The second data is explained next. FIG. 17 illustrates an example of the second data. The second data in the example is in the format of a table. However, the second data may be in another format other than a table format.

The second data in the example includes block records corresponding to the basic blocks. The block records of the second data include a field for setting basic block numbers and a field for setting the second execution frequency of the instruction types in the basic blocks. As mentioned above, the second execution frequency is a running total of the execution of instructions belonging to an instruction type for each instruction type in the basic block. The second execution frequency is derived by multiplying the first execution frequency (see FIG. 16) of each basic block by a percentage (see FIG. 7) of instruction types in the basic block. The second execution frequency is an estimated value and not an actual measurement value in the same way as the first execution frequency. However, the second execution frequency is considered to approximate the actual measurement value from a statistical perspective.

The first block record in this example indicates that instructions belonging to the "integer arithmetic" instruction type in the first basic block were executed a total of "250,000,000" times during the sampling period. Similarly, the first block record indicates that no instructions belonging to the "floating-point arithmetic" instruction type in the first basic block were executed during the sampling period. Similarly, the first block record indicates that instructions belonging to the "branch instruction" instruction type in the first basic block were executed a total of "125,000,000" times during the sampling period. Similarly, the first block record indicates that instructions belonging to the "load or store" instruction type in the first basic block were executed a total of "625,000,000" times during the sampling period.

The second block record in this example indicates that instructions belonging to the "integer arithmetic" instruction type in the second basic block were executed a total of "500,000,000" times during the sampling period. Similarly, the second block record indicates that instructions belonging to the "floating-point arithmetic" instruction type in the second basic block were executed a total of "1,200,000,000" times during the sampling period. Similarly, the second block record indicates that instructions belonging to the "branch instruction" instruction type in the second basic block were executed a total of "100,000,000" times during the sampling period. Similarly, the second block record indicates that instructions belonging to the "load or store" instruction type in the second basic block were executed a total of "200,000,000" times during the sampling period.

The third block record in this example indicates that instructions belonging to the "integer arithmetic" instruction type in the third basic block were executed a total of "100,000,000" times during the sampling period. Similarly, the third block record indicates that instructions belonging to the "floating-point arithmetic" instruction type in the third basic block were executed a total of "2,000,000,000" times during the sampling period. Similarly, the third block record indicates that instructions belonging to the "branch instruction" instruction type in the third basic block were executed a total of "100,000,000" times during the sampling period. Similarly, the third block record indicates that instructions belonging to the "load or store" instruction type in the third basic block were executed a total of "800,000,000" times during the sampling period.

The fourth block record in this example indicates that instructions belonging to the "integer arithmetic" instruction type in the fourth basic block were executed a total of "20,000,000" times during the sampling period. Similarly, the fourth first block record indicates that no instructions belonging to the "floating-point arithmetic" instruction type in the fourth basic block were executed during the sampling period. Similarly, the fourth block record indicates that instructions belonging to the "branch instruction" instruction type in the fourth basic block were executed a total of "20,000,000" times during the sampling period. Similarly, the fourth block record indicates that instructions belonging to the "load or store" instruction type in the fourth basic block were executed a total of "60,000,000" times during the sampling period.

The result data is explained next. FIG. 18 illustrates an example of the result data. The result data in this example has a field for setting a third execution frequency of each instruction type. The third execution frequency is a running total of executions of instructions belonging to an instruction type for each instruction type in the execution program. The third execution frequency is derived by totaling the second execution frequency (see FIG. 17) of each basic block for each instruction type. The third execution frequency is an estimated value and not an actual measurement value in the same way as the first and execution frequencies. However, the third execution frequency is considered to approximate the actual measurement value from a statistical perspective.

The result data in this example indicate that instructions belonging to the "integer arithmetic" instruction type in the execution program were executed a total of "5,000,000,000" times during the sampling period. The result data in this example indicate that instructions belonging to the "floating-point arithmetic" instruction type in the execution program were executed a total of "20,000,000,000" times during the sampling period. The result data in this example indicate that instructions belonging to the "branch instruction" instruction type in the execution program were executed a total of "10,000,000,000" times during the sampling period. Moreover, the result data in this example indicate that instructions belonging to the "load or store" instruction type in the execution program were executed a total of "15,000,000,000" times during the sampling period.

Figure 19:
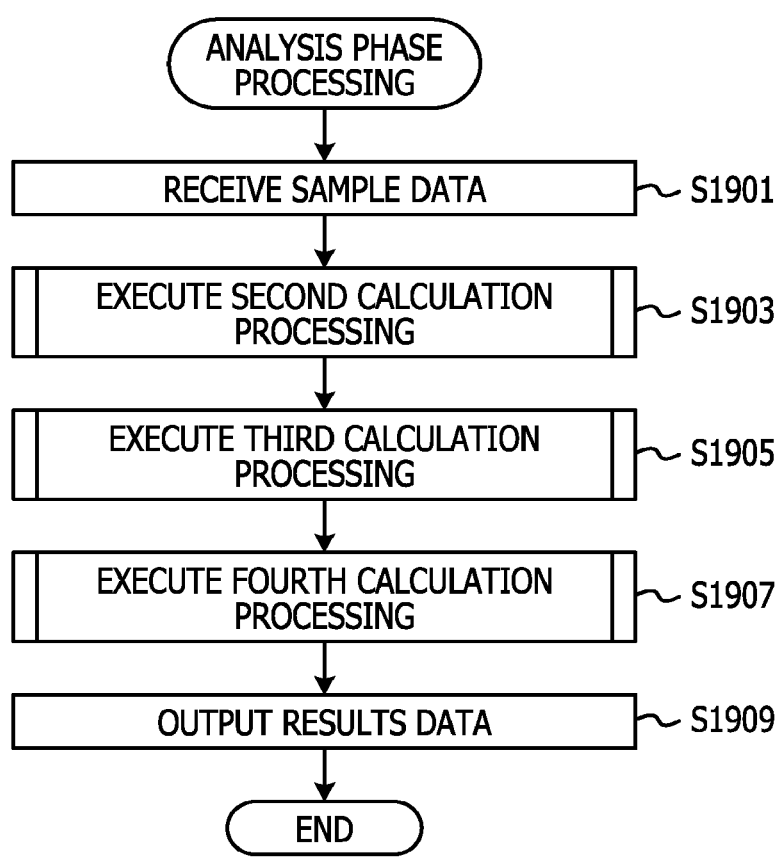
FIG. 19 illustrates an example of a processing flow for an analysis phase.

The discussion of the preparation phase (S101) is continued. FIG. 19 illustrates an example of a processing flow for the analysis phase (S105). The receiving unit 241 receives the sample data (S1901). The receiving unit 241 may receive the sample data from the output program 219 of the first information processing apparatus 201 via a network (e.g., a LAN or the Internet). Alternatively, the receiving unit 241 may receive the sample data via a recording medium. The received sample data is stored in the sample storage unit 243. The sample data depicted in FIG. 13 is stored in the sample storage unit 243 in this example.

The second calculating unit 1501 executes the second calculation processing (S1903). The second calculating unit 1501 calculates the frequency, that is the first execution frequency, of the execution of the instructions included in each basic block during the sampling period based on the sample data and the block map in the second calculation processing as mentioned above.

Figure 20:
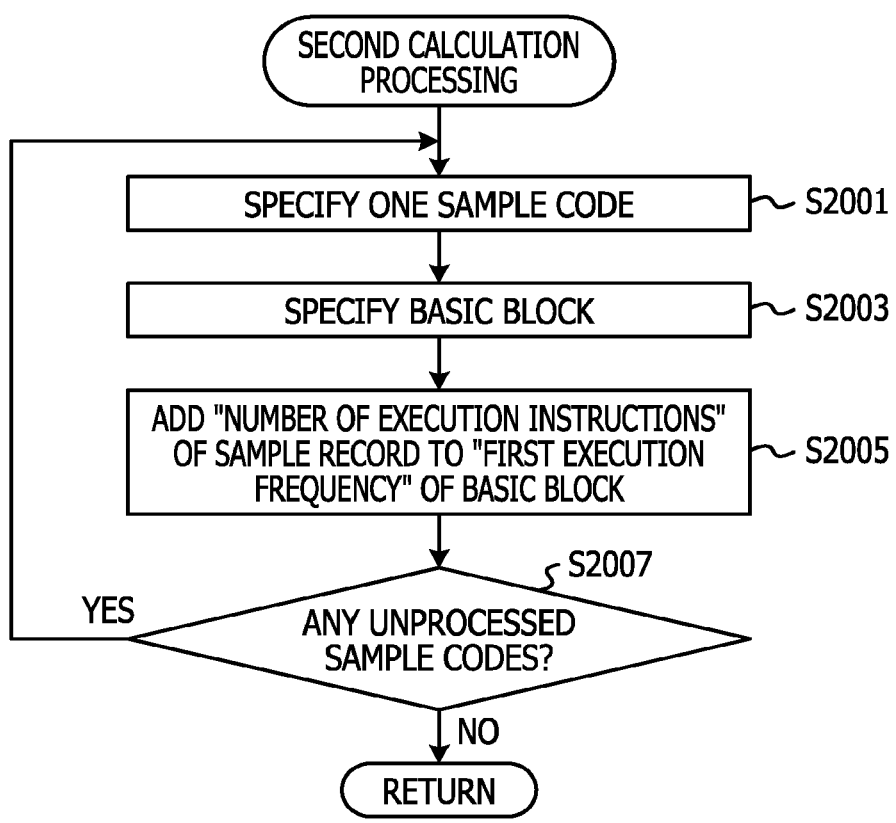
FIG. 20 illustrates an example of a second calculation processing flow.

The second calculation processing will be explained next. FIG. 20 illustrates an example of a second calculation processing flow. The second calculating unit 1501 specifies one sample code included in the sample data stored in the sample storage unit 243 (S2001). The second calculating unit 1501 sequentially specifies the sample codes from the top for example.

The second calculating unit 1501 specifies the basic block executed when the samples set in the specified sample code are extracted based on the block map stored in the block map storage unit 237 (S2003). Specifically, the second calculating unit 1501 searches for a range including the execution address set in the specified sample code within the range set in the block map. The basic block is specified by the basic block number of the block record that sets the range including the execution address.

The second calculating unit 1501 adds the number of execution instructions set in the sample code specified in S2001 to the first execution frequency of the block record corresponding to the basic block specified in S2003 among the block records of the first data (S2005).

The second calculating unit 1501 determines whether there are any unprocessed sample codes (S2007). If it is determined that there is an unprocessed sample code, the routine returns to S2001 and the abovementioned processing is repeated.

Conversely, if it is determined that there are no unprocessed sample codes, the second calculation processing is completed. The routine returns to the processing in S1905 in FIG. 19 when the second calculation processing is completed.

The explanation now returns to FIG. 19. The third calculating unit 1505 executes the third calculation processing (S1905). The third calculating unit 1505 calculates the frequency of the executions of instructions belonging to each instruction type in the basic block, that is the second execution frequency, by multiplying the first execution frequency in the basic block by the percentage accounted for by the instructions belonging to each instruction type in the basic block in the third calculation processing.

Figure 21:
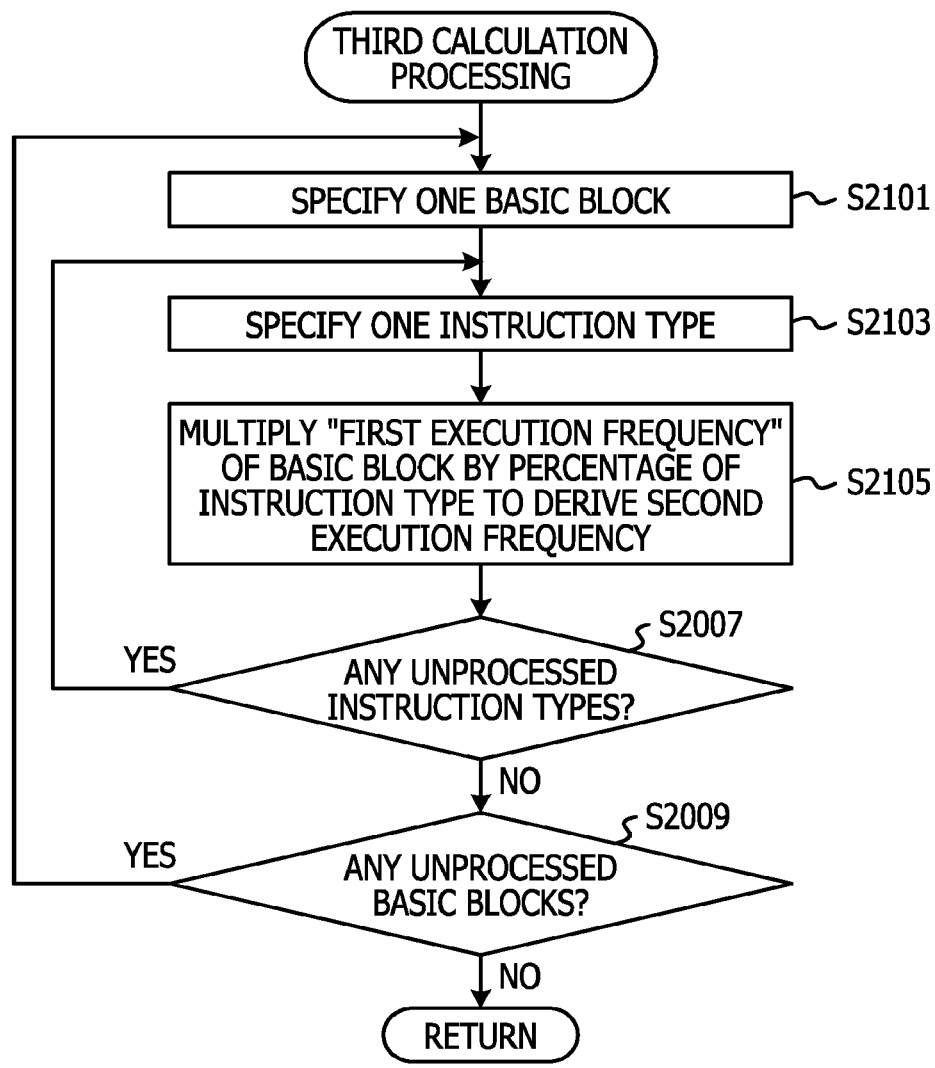
FIG. 21 illustrates an example of a third calculation processing flow.

The third calculation processing will be explained next. FIG. 21 illustrates an example of a third calculation processing flow. The third calculating unit 1505 specifies one basic block (S2101). The third calculating unit 1505 sequentially specifies the block records of the first data from the top for example. The third calculating unit 1505 specifies one instruction type among the instruction types for which the percentage has been calculated in S1011 in the first calculation processing depicted in FIG. 10 (S2103). The third calculating unit 1505 reads, from the percentage data, the percentage of the instruction type specified in S2103 for the basic block specified in S2101.

The third calculating unit 1505 then multiplies the first execution frequency of the basic block specified in S2101 by the percentage of the instruction type read from the percentage data to derive the execution frequency of the instructions belonging to the instruction type of the basic block during the sampling period, that is, the third calculating unit 1505 derives the second execution frequency (S2105). The derived second execution frequency is set in the field of the second execution frequency of the instruction type included in the block record of the basic block specified in S2101.

The third calculating unit 1505 determines whether there are any unprocessed instruction types (S2107). If it is determined that there is an unprocessed instruction type, the routine returns to the processing indicated in S2103 and the abovementioned processing is repeated.

Conversely, if it is determined that there are no unprocessed instruction types, the third calculating unit 1505 then determines if there are any unprocessed basic blocks (S2109). If it is determined that there is an unprocessed basic block, the routine returns to the processing indicated in S2101 and the abovementioned processing is repeated.

Conversely, if it is determined that there are no unprocessed basic blocks, the third calculation processing is completed. The routine returns to the processing in S1907 in FIG. 19 when the third calculation processing is completed.

The explanation now returns to FIG. 19. The fourth calculating unit 1509 executes the fourth calculation processing (S1907). The fourth calculating unit 1509 calculates the total of the second execution frequencies in each basic block for each instruction type in the fourth calculation processing. Specifically, the fourth calculating unit 1509 tallies the second execution frequencies in each basic block for each instruction type. The third execution frequency totaled for each instruction type in the fourth calculation processing corresponds to the frequency of executions by the execution program of instructions belonging to the instruction type during the sampling period.

Figure 22:
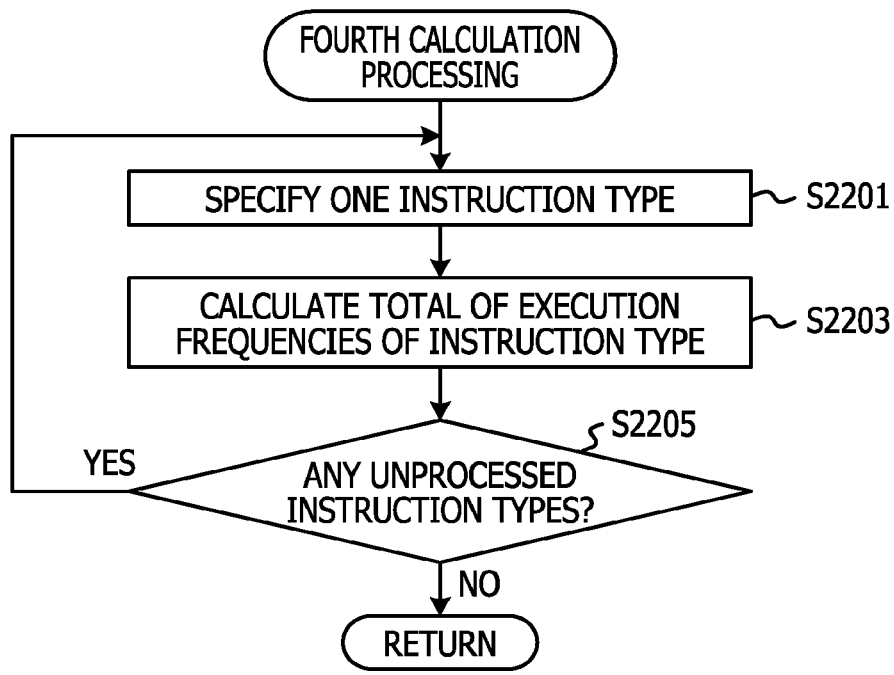
FIG. 22 illustrates an example of a fourth calculation processing flow.

The fourth calculation processing will be explained next. FIG. 22 illustrates an example of a fourth calculation processing flow. The fourth calculating unit 1509 specifies one instruction type among the instruction types for which the percentage has been calculated in S1011 in the first calculation processing depicted in FIG. 10 (S2201).

The fourth calculating unit 1509 gathers and totals the second execution frequencies of the specified instruction types from the block records of the second data (S2203). The calculated total value is set in the third execution frequency of the instruction type in the result data stored in the result storage unit 247.

The fourth calculating unit 1509 determines whether there are any unprocessed instruction types (S2205). If it is determined that there is an unprocessed instruction type, the routine returns to the processing indicated in S2201 and the abovementioned processing is repeated.

Conversely, if it is determined that there are no unprocessed instruction types, the fourth calculation processing is completed. The routine returns to the processing in S1909 in FIG. 19 when the fourth calculation processing is completed.

The explanation now returns to FIG. 19. The output unit 249 outputs the result data stored in the result storage unit 247 (S1909). The output unit 249 displays the result data for example. The format outputted by the output unit is not limited to a display and may include transmitting or writing the result data on a storage medium for example. Further, the result data may be kept in the result storage unit 247 and the output of the result data by the output unit 249 may be omitted. The explanation of the analysis phase (S105) is finished.

The instruction type is not limited to the abovementioned instruction types. The instruction type may include a product-sum operation for example. The instruction type may include a single-instruction multiple-data (SIMD) operation for example. Further, the implementation formats mentioned in the present embodiment and mentioned below may be applied to an arithmetic processing unit other than a CPU.

Here, an additional explanation regarding the estimation of the first execution frequency in the present embodiment is provided. First, the size of the basic block is examined. A large basic block has a wider range and thus has a higher possibility of being executed at the point in time of extraction. Therefore, a large basic block more often corresponds to an execution address of a sample and the first execution frequency is more likely to increase.

Conversely, a small basic block has a narrower range and thus has a lower possibility of being executed at the point in time of extraction. Therefore, a smaller basic block less likely corresponds to a sample execution address and the first execution frequency is more likely to decrease.

If it is assumed that the frequency of processing in each basic block is equal, the first execution frequency of a basic block with a large number of instructions increases and the first execution frequency of a basic block with a small number of instructions decreases. Therefore, the first execution frequency in the present embodiment tends to approximate an actual measurement value.

The frequency of processing in a basic block will be discussed. A basic block having a high processing frequency often corresponds to an execution address of a sample and the first execution frequency is likely to increase.

In contrast, a basic block having a low processing frequency corresponds less often to an execution address of a sample and the first execution frequency is likely to decrease.

If it is assumed that the size of each basic block is equal, the first execution frequency of a basic block that is being processed frequently increases and the first execution frequency of a basic block that is processed less often decreases, and the first execution frequency in the present embodiment is likely to approximate an actual measurement value.

The analysis phase (S105) is separated from the measurement phase (S103) according to the present embodiment and thus the number of executions per instruction type in an arithmetic processing unit can be measured while maintaining a low load. The number of executions per instruction type is useful, for example, for adjusting the information processing apparatus that uses the arithmetic processing unit.

Moreover, because instruction types can be set individually, the number of executions of an instruction type that is not set as a performance event for the performance monitoring counter can be derived. It is useful to use the execution frequency of a specific instruction type as an indicator of the performance of an arithmetic processing unit as an operating environment of a program including many of the specific instruction types when deriving the execution frequency of a specific instruction type. For example, when deriving the execution frequency of a floating-point arithmetic operation in the operation of a program including many floating-point arithmetic instructions, the performance of the arithmetic processing unit as the operating environment of the program can be understood.

Further, because the execution frequency of the basic block matches the execution frequency of each instruction included in the basic block, the execution frequency of instructions can be divided proportionately into instruction types as units of the basic block whereby the execution frequency of different instruction types can be derived more precisely.

The number of executions per instruction type is also useful for evaluating the processing performance per unit of time because the sampling is performed based on the number of cycles.

Second Embodiment

While the above embodiment discussed an example of sampling based on the number of cycles, the present embodiment discusses an example of sampling based on the number of cache misses.

Figure 23:
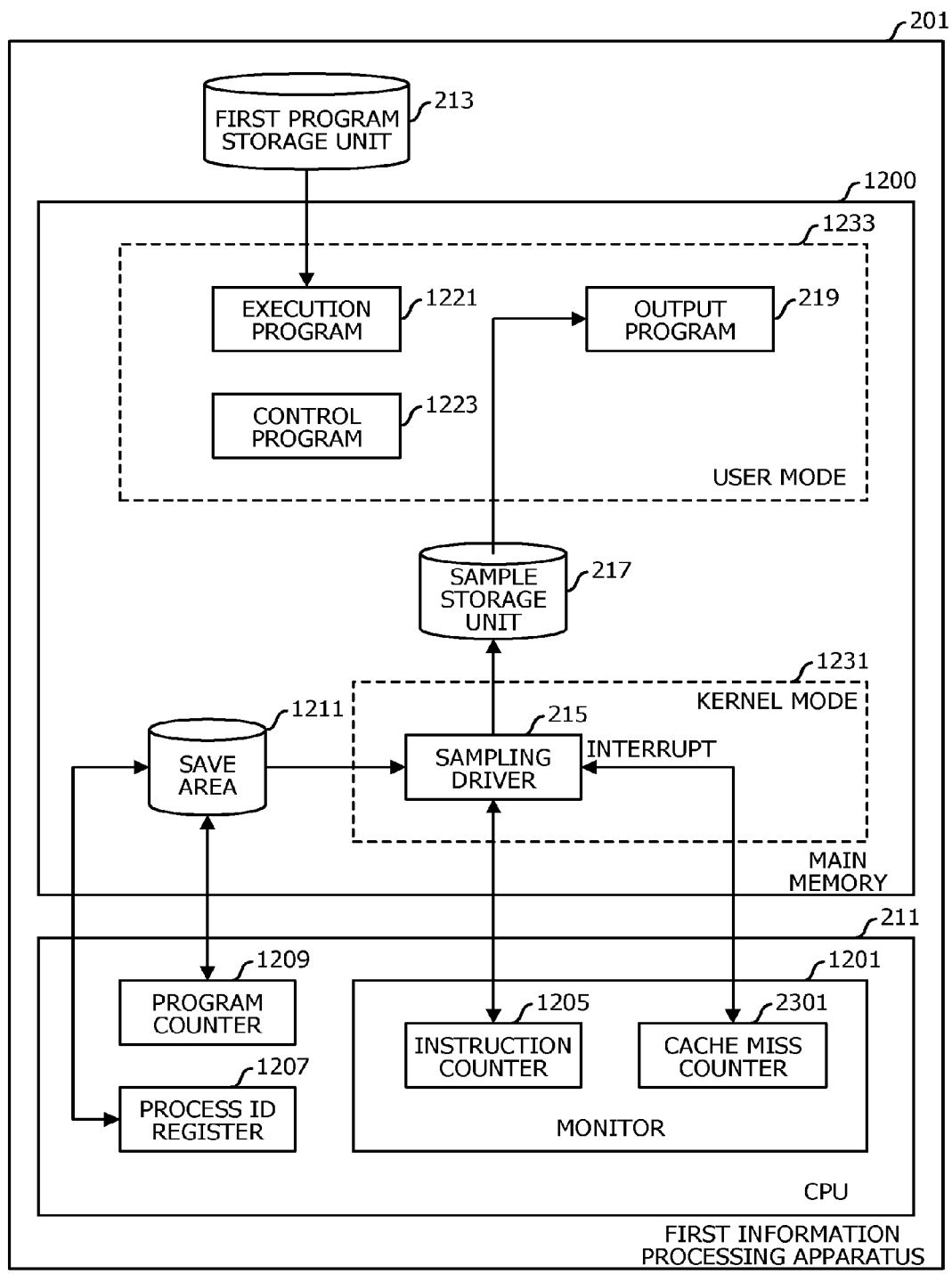
FIG. 23 illustrates an example of a module configuration of the first information processing apparatus according to a second embodiment.

FIG. 23 illustrates an example of a module configuration of a first information processing apparatus 201 according to a second embodiment. The monitor 1201 depicted in FIG. 23 counts events of cache misses instead of cycle events. A cache miss counter 2301 depicted in FIG. 23 indicates a performance monitoring counter for counting the cache miss events.

The sampling processing in the present embodiment is described in FIG. 14. The sampling driver 215 in S1401 sets an event of the number of cache misses and an event of the number of execution instructions in the monitor 1201. In this example, the number of cache misses is counted by one of the performance monitoring counters in the monitor 1201. The cache miss counter 2301 depicted in FIG. 23 corresponds to this performance monitoring counter. In the same way as in the first embodiment, the instruction counter 1205 depicted in FIG. 23 in which the number of execution instructions is counted corresponds to the performance monitoring by the other performance monitoring counter in the monitor 1201.

In S1403, the sampling driver 215 initializes the cache miss counter 2301 and the instruction counter 1205. The cache miss counter 2301 is used for measuring the timing of extracting samples by the sampling driver 215. As a result, the initial value of the cache miss counter 2301 is set so that the cache miss counter 2301 overflows when the number of cache misses reaches a predetermined number. An interruption of the sampling driver 215 is generated when the cache miss counter 2301 overflows. Samples are extracted upon the generation of the interruption. The initial value of the instruction counter 1205 is zero in the same way as in the first embodiment.

The sampling driver 215 activates the monitor 1201 in the same way as in the first embodiment (S1405).

The sampling driver 215 waits until the generation of an interruption due to the overflow of the cache miss counter 2301 (S1407). When an interruption due to the overflow of the cache miss counter 2301 is generated, the CPU 211 saves the data pertaining to the operation of the execution program 1221 in the save area 1211 in the same way as in the first embodiment.

Next, the operation of the sampling driver 215 is switched. The sampling driver 215 obtains the number of execution instructions from the instruction counter 1205 in the same way as in the first embodiment (S1409).

The sampling driver 215 obtains the process ID and the execution address from the save area 1211 in the same way as in the first embodiment (S1411).

The sampling driver 215 stores the process ID, the execution address, and the number of execution instructions in a new sample code of the sample data in the same way as in the first embodiment (S1413).

The sampling driver 215 initializes the cache miss counter 2301 and the instruction counter 1205 in the same way as in S1403 (S1415). At this stage, the CPU 211 recovers the data pertaining to the operation of the execution program 1221 from the save area 1211 and returns to the operation of the execution program 1221.

The sampling driver 215 returns to the processing indicated in S1407 and waits until the generation of the next interruption. In this way, the processing from S1407 to S1415 is repeated until the sampling processing is stopped.

The preparation phase (S101) and the analysis phase (S105) are performed in the same way as in the first embodiment.

According to the present embodiment, the sampling is performed based on the number of cache misses which is useful for evaluating the performance in a state in which cache misses often occur.

Third Embodiment

The present embodiment discusses an example of sampling based on the number of execution instructions.

Figure 24:
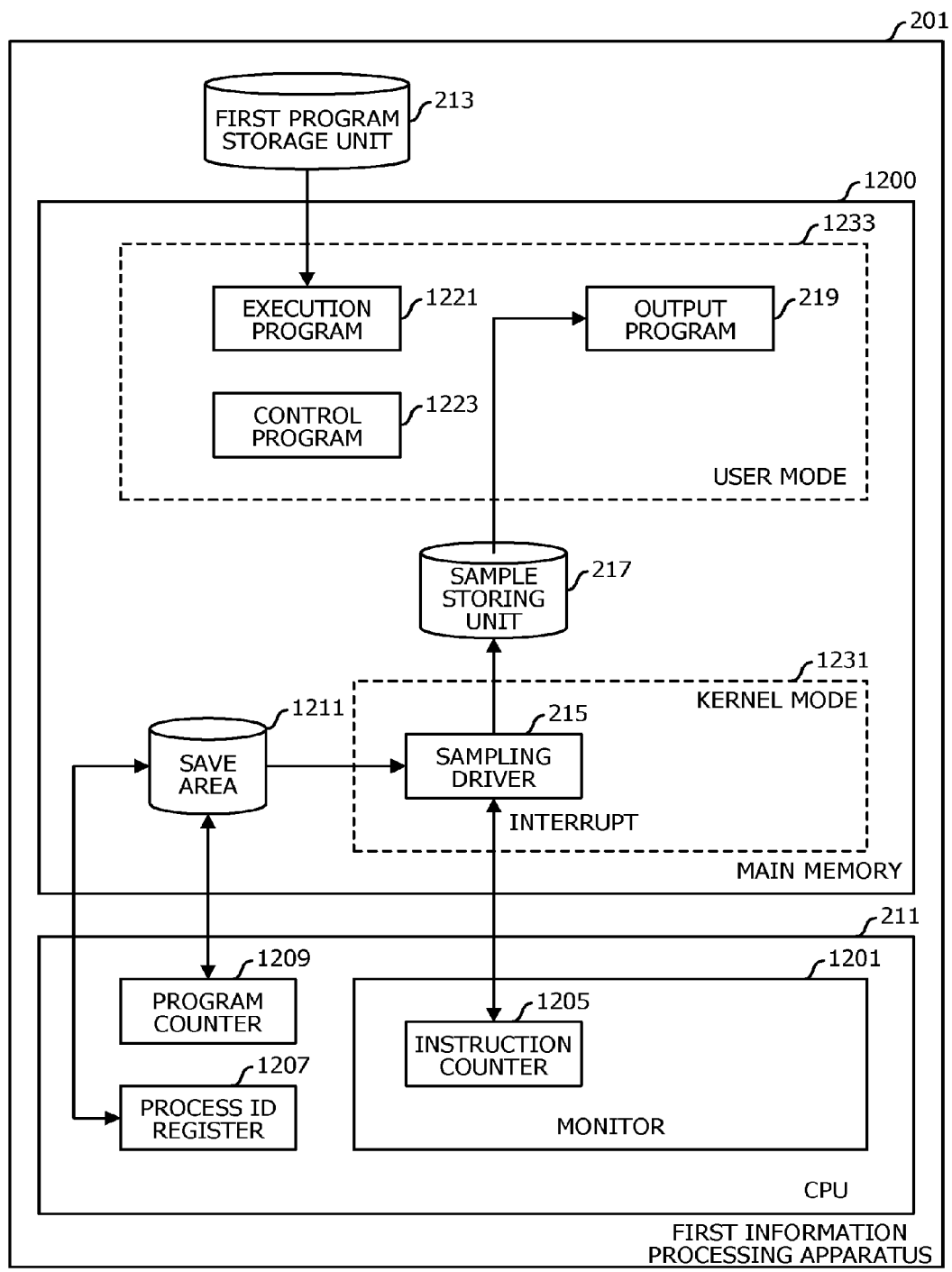
FIG. 24 illustrates an example of a module configuration of the first information processing apparatus according to a third embodiment.

FIG. 24 illustrates an example of a module configuration of the first information processing apparatus 201 according to a third embodiment. Samples are extracted upon an interruption due to an overflow of the instruction counter 1205 in the present embodiment. Therefore, a performance monitoring counter other than the instruction counter 1205 may not be desired.

Figure 25:
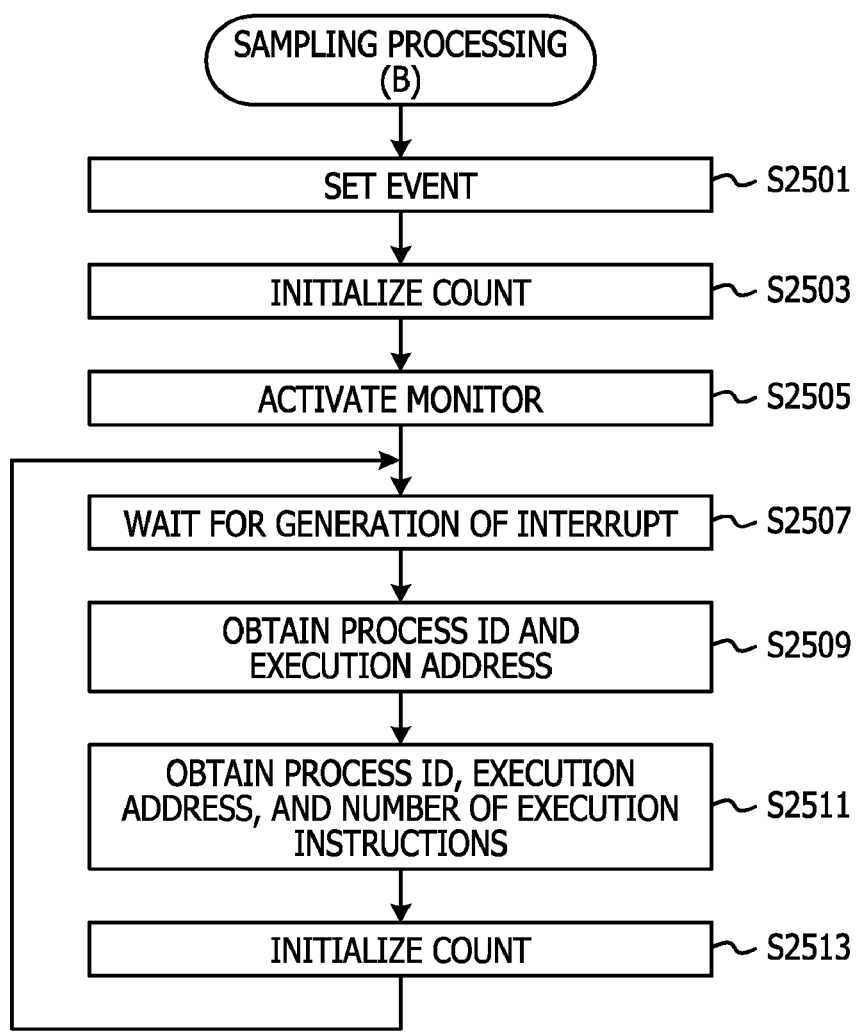
FIG. 25 illustrates an example of a flow of sampling processing (B)

FIG. 25 illustrates an example of a flow of sampling processing (B). The sampling driver 215 sets an event of the number of execution instructions in the monitor 1201 (S2501). Further, the number of execution instructions is counted by the one performance monitoring counter in the monitor 1201. The instruction counter 1205 depicted in FIG. 24 corresponds to this performance monitoring counter.

The sampling driver 215 initializes the instruction counter 1205 (S2503). The instruction counter 1205 is used for measuring the timing of extracting samples by the sampling driver 215. As a result, the initial value of the instruction counter 1205 is set so that the instruction counter 1205 overflows when the number of execution instructions reaches a predetermined number. An interruption of the sampling driver 215 is generated when the instruction counter 1205 overflows. Samples are extracted upon the generation of the interruption. The number of instructions executed between sample extractions is a predetermined number.

The sampling driver 215 activates the monitor 1201 in the same way as in the first embodiment (S2505).

The sampling driver 215 waits until the generation of an interruption due to the overflow of the instruction counter 1205 (S2507). When an interruption due to the overflow of the instruction counter 1205 is generated, the CPU 211 saves the data pertaining to the operation of the execution program 1221 in the save area 1211 in the same way as in the first embodiment.

The sampling driver 215 obtains the process ID and the execution address from the save area 1211 in the same way as in the first embodiment (S2509).

The sampling driver 215 stores the process ID, the execution address, and the number of execution instructions in a new sample code of the sample data in the same way as in the first embodiment (S2511). Because the number of execution instructions is fixed, the number of execution instructions may not be stored in the new sample code.

The sampling driver 215 initializes the instruction counter 1205 in the same way as in S2503 (S2513). At this stage, the CPU 211 recovers the data pertaining to the operation of the execution program 1221 from the save area 1211 and returns to the operation of the execution program 1221.

The sampling driver 215 returns to the processing indicated in S2507 and waits until the generation of the next interruption. In this way, the processing from S2507 to S2513 is repeated until the sampling processing is stopped.

The preparation phase (S101) and the analysis phase (S105) are performed in the same way as in the first embodiment. The number of execution instructions added to the first execution frequency is a fixed number and thus may not be read from the sample code.

According to the present embodiment, sampling is performed based on the number of execution instructions and thus the number of usages of the performance monitoring counter may be reduced.

Fourth Embodiment

While the above embodiments discuss examples of deriving a third execution frequency for four instruction types, the number of instruction types to be analyzed is not limited to four. The present embodiment discusses an example of deriving the third execution frequency for one instruction type.

The module configurations and the processing of the first information processing apparatus 201 and the second information processing apparatus 203 are the same as in the above embodiments. The following discussion depicts an example of data when one instruction type is used as the object.

FIG. 26 illustrates an example of percentage data according to the fourth embodiment. The percentage data in this example is also depicted in the format of a table as in the example in FIG. 7. The percentage data in the example has block records corresponding to the basic blocks in the same way as in FIG. 7. The block records of the percentage data include a field for setting basic block numbers, a field for setting the percentages of instructions belonging to the "floating-point arithmetic" instruction type in the basic block, and a field for setting the percentages of instructions belonging to "other" in the basic block. However, the field for setting the percentages of instructions belonging to the "other" instruction type may be omitted.

The first block record in the example indicates that the percent of instructions belonging to the "floating-point arithmetic" instruction type in the first basic block is "0.0" percent. Similarly, the first block record in the example indicates that the percent of instructions belonging to the "other" instruction type in the first basic block is "100.0" percent.

The second block record in the example indicates that the percent of instructions belonging to the "floating-point arithmetic" instruction type in the second basic block is "60.0" percent. Similarly, the second block record in the example indicates that the percent of instructions belonging to the "other" instruction type in the second basic block is "40.0" percent.

The third block record in the example indicates that the percent of instructions belonging to the "floating-point arithmetic" instruction type in the third basic block is "66.7" percent. Similarly, the third block record in the example indicates that the percent of instructions belonging to the "other" instruction type in the third basic block is "33.3" percent.

The fourth block record in the example indicates that the percent of instructions belonging to the "floating-point arithmetic" instruction type in the fourth basic block is "0.0" percent. Similarly, the fourth block record in the example indicates that the percent of instructions belonging to the "other" instruction type in the fourth basic block is "100.0" percent.

FIG. 27 illustrates an example of second data according to the fourth embodiment. The second data in this example is also depicted in the format of a table as in the example in FIG. 17. The second data in the example has block records corresponding to the basic blocks in the same way as in FIG. 17. The block records of the second data include a field for setting basic block numbers, a field for setting the second execution frequency of the "floating-point arithmetic" instruction type in the basic block, and a field for setting the second execution frequency of the instruction type "other" in the basic block. However, the field for setting the second execution frequency of the instruction type "other" in the basic block may be omitted.

In this example, the first block record indicates that no instructions belonging to the "floating-point arithmetic" instruction type in the first basic block were executed during the sampling period. Similarly, the first block record indicates that instructions belonging to the "other" instruction type in the first basic block were executed a total of "1,000,000,000" times during the sampling period.

The second block record in this example indicates that instructions belonging to the "floating-point arithmetic" instruction type in the second basic block were executed a total of "1,200,000,000" times during the sampling period. Similarly, the second block record indicates that instructions belonging to the "other" instruction type in the second basic block were executed a total of "800,000,000" times during the sampling period.

The third block record in this example indicates that instructions belonging to the "floating-point arithmetic" instruction type in the third basic block were executed a total of "2,000,000,000" times during the sampling period. Similarly, the third block record indicates that instructions belonging to the "other" instruction type in the third basic block were executed a total of "1,000,000,000" times during the sampling period.

In this example, the fourth block record indicates that no instructions belonging to the "floating-point arithmetic" instruction type in the fourth basic block were executed during the sampling period. Similarly, the fourth block record indicates that instructions belonging to the "other" instruction type in the fourth basic block were executed a total of "100,000,000" times during the sampling period.

FIG. 28 illustrates an example of result data according to the fourth embodiment. The result data in this example includes a field for setting the third execution frequency of the "floating-point arithmetic" instruction type and a field for setting the third execution frequency of the "other" instruction type. However, the basic block the field for setting the third execution frequency of the instruction type "other" in the basic block may be omitted.

The result data in this example indicate that instructions belonging to the "floating-point arithmetic" instruction type in the execution program were executed a total of "20,000,000,000" times during the sampling period. Moreover, the result data in this example indicate that instructions belonging to the "other" instruction type in the execution program were executed a total of "30,000,000,000" times during the sampling period.

The analysis phase (S105) processing can be completed quickly if the number of instruction types to be analyzed is reduced as in the present embodiment.

Fifth Embodiment

The above embodiments discuss examples in which the processing of the preparation phase (S101), the processing of the measurement phase (S103), and the processing of the analysis phase (S105) are executed by one information processing apparatus.

Figure 29:
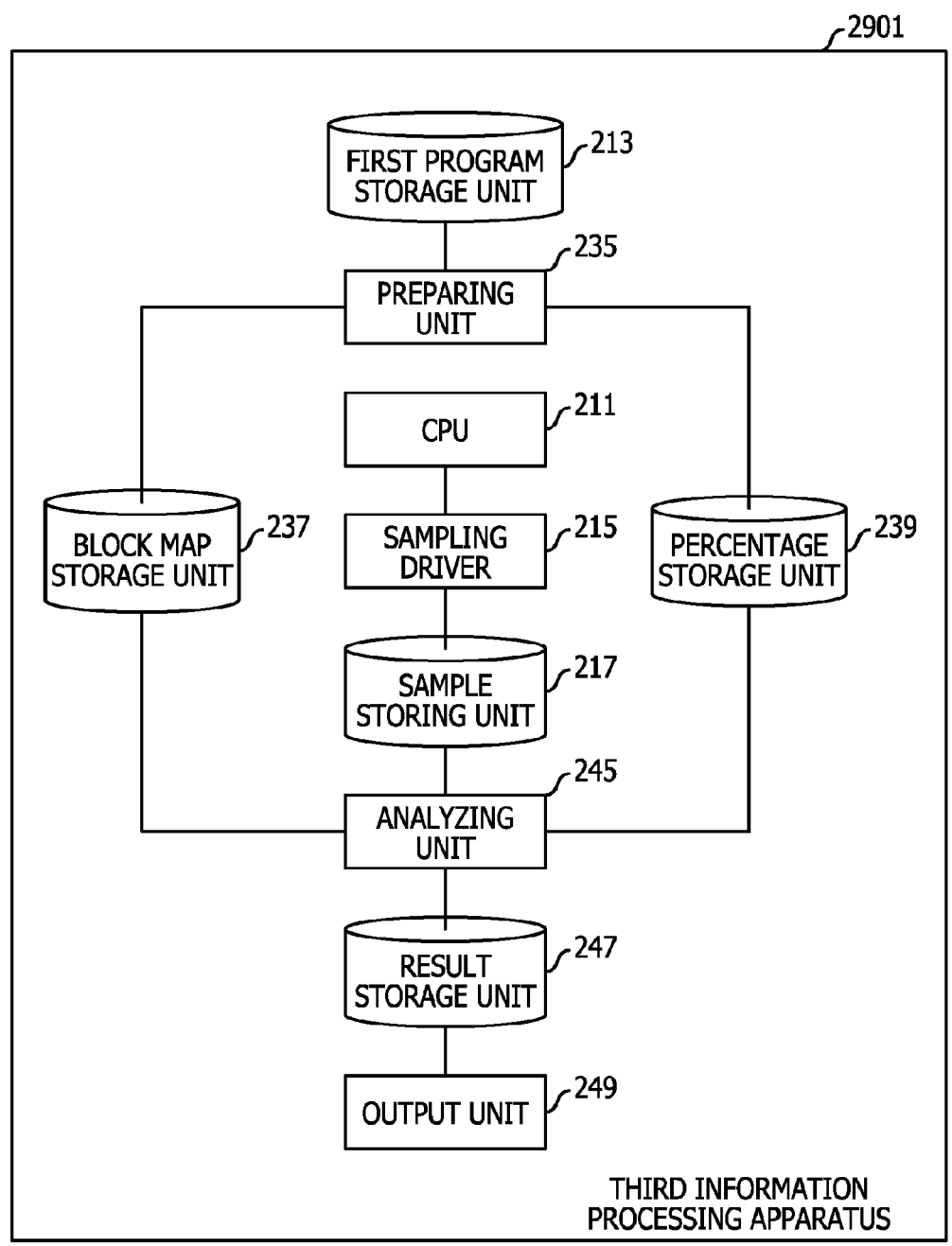
FIG. 29 illustrates an example of a module configuration of a third information processing apparatus.

FIG. 29 illustrates an example of a module configuration of a third information processing apparatus 2901. The third information processing apparatus 2901 has the CPU 211, the first program storage unit 213, the sampling driver 215, and the sample storing unit 217 in the same way as the first information processing apparatus 201 depicted in FIG. 2.

The third information processing apparatus 2901 has the preparing unit 235, the block map storage unit 237, the percentage storage unit 239, the analyzing unit 245, the result storage unit 247, and the output unit 249 in the same way as the second information processing apparatus 203 depicted in FIG. 2.

The processing for obtaining the execution program indicated in S801 in the preparation phase (S101) depicted in FIG. 8 may be omitted in the present embodiment. Other processing in the preparation phase (S101) is performed in the same way as in the above embodiments.

The processing for outputting sample data indicated in S1111 in the measurement phase (S103) depicted in FIG. 11 may be omitted in the present embodiment. Other processing in the measurement phase (S103) depicted in FIG. 11 is performed in the same way as in the above embodiments.

The processing for receiving sample data indicated in S1901 in the analysis phase (S105) depicted in FIG. 19 may be omitted in the present embodiment. The analyzing unit 245 reads the sample data from the sample storing unit 217. However, the sample storage unit 243 is provided in the third information processing apparatus 2901 and the sample data stored in the sample storing unit 217 may also be copied to the sample storage unit 243. In this example, the analyzing unit 245 reads the sample data from the sample storage unit 243. Other processing in the analysis phase (S105) is performed in the same way as in the above embodiments.

The three phases may not be carried out consecutively in the same way as in the above embodiments. That is, the processing of the preparation phase (S101) and the processing of the measurement phase (S103) may not be executed consecutively. Further, the processing of the measurement phase (S103) and the processing of the analysis phase (S105) may not be executed consecutively.

Even if the processing in the preparation phase (S101), the processing in the measurement phase (S103), and the processing in the analysis phase (S105) is executed in the one information processing apparatus as in the present embodiment, the analysis phase (S105) is isolated from the measurement phase (S103) and the execution frequency for each instruction type can be measured in the arithmetic processing unit while maintaining a low load.

While embodiments of the present disclosure have been described as above, the present disclosure is not limited to these embodiments. For example, the above functional block configuration may not match the configurations of the program modules.

The configurations of the storage regions described above are merely examples, and are not necessarily configured as described above. Moreover, if the order of the processing flows is altered, the order of the processing may be switched or multiple processing may be executed in parallel.

The first information processing apparatus 201, the second information processing apparatus 203, and the third information processing apparatus 2901 described above are computer devices and, as illustrated in FIG. 30, include a memory 2501, a central processing unit (CPU) 2503, a hard disk drive (HDD) 2505, a display controller 2507 connected to a display device 2509, a drive device 2513 for a removable disk 2511, an input device 2515, and a communication control unit 2517 for connecting to a network. All of the devices are connected to a bus 2519. An application program for implementing the processing of the present embodiments and an operating system (OS) are stored in the HDD 2505 and read from the HDD 2505 to the memory 2501 when executed by the CPU 2503. The CPU 2503 controls the display controller 2507, the communication control unit 2517, and the drive device 2513 in accordance with the processing contents of the application program to cause the devices to conduct certain operations. Data during processing is mostly stored in the memory 2501, but may also be stored in the HDD 2505. In the present embodiment, the application program for implementing the abovementioned processing is stored and distributed on the computer-readable removable disk 2511 and installed from the drive device 2513 to the HDD 2505. The application program may also be installed on the HDD 2505 through the communication control unit 2517 and a network such as the Internet. This type of computer device implements the various functions described above due to the organic cooperation of hardware, such as the abovementioned CPU 2503 and the memory 2501, and programs such as the OS and the application program.

A summary of the embodiments described above is as follows.

A program execution analysis method according to the present embodiments involves: (A) calculating a percentage of an instruction belonging to a certain instruction type among instruction types included in a block, in each of a plurality of blocks partitioned from a program; (B) extracting an execution address and a number of execution instructions from an arithmetic processing unit that is executing the program; (C) calculating a first execution frequency of the instruction included in the block in each of the plurality of blocks based on the execution address and the number of execution instructions; (D) calculating a second execution frequency of the instruction belonging to the instruction type by multiplying the first execution frequency of the block by the percentage in the block in each of the plurality of blocks; and (E) calculating the total of second execution frequencies calculated for each of the plurality of blocks.

Consequently, it is possible to measure the number of executions of instructions belonging to certain instruction types in an arithmetic processing unit while maintaining a low load. The number of executions per instruction type is useful, for example, for adjusting the information processing apparatus that uses the arithmetic processing unit.

Further, the plurality of blocks may be a plurality of basic blocks.

Because the execution frequency of the basic block matches the execution frequency of each instruction included in the basic block, the execution frequency of instructions can be divided proportionately into instruction types as units of the basic block whereby the execution frequency of different instruction types can be derived more precisely.

Furthermore, the execution address and the number of execution instructions may be extracted from the arithmetic processing unit by sampling based on the number of cycles.

Accordingly, number of executions per instruction type may be useful in evaluating processing capability per unit of time.

Furthermore, the execution address and the number of execution instructions may be extracted from the arithmetic processing unit by sampling based on the number of cache misses.

The number of executions per instruction type may also be useful for evaluating the performance in a state in which cache misses often occur.

Furthermore, the execution address and the number of execution instructions may be extracted from the arithmetic processing unit by sampling based on the number of execution instructions.

In this way, the number of usages of the performance monitoring counters may be reduced.

Programs may be made to cause a computer to conduct processing according to the above methods. The programs may be stored in a computer-readable storage medium or a storage device such as, for example, a flexible disk, a CD-ROM, an optical magnetic disc, a semiconductor memory, or a hard disk and the like. Generally, intermediate processing results are temporarily stored in a storage device such as a main memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method comprising:
    calculating, by a processor, a percentage of an instruction belonging to a certain instruction type among instruction types included in a block, the block being one of a plurality of blocks partitioned from a program;
    extracting an execution address and a number of execution instructions from an arithmetic processing unit that executes the program and performs sampling of the execution address and the number of execution instructions at a plurality of time points, the number of execution instructions indicating number of instructions executed after precedent time point among the plurality of time points;
    calculating, by the processor, a first execution frequency of the instruction included in the block in each of the plurality of blocks based on the extracted execution address and the number of execution instructions;
    calculating, by the processor, a second execution frequency of the instruction belonging to the instruction type by multiplying the first execution frequency of the block by the percentage of the instruction in the block;
    calculating, by the processor, total number of second execution frequencies calculated for each of the plurality of blocks; and
    storing the calculated total number of the second execution frequencies to a memory.

2. The method according to claim 1, wherein the plurality of blocks is a plurality of basic blocks, each of the basic blocks includes a branch instruction as a last instruction.

3. The method according to claim 1, wherein the execution address and the number of execution instructions are acquired by sampling at the plurality of time points based on a number of cycles.

4. The method according to claim 1, wherein the execution address and the number of execution instructions are acquired by sampling at the plurality of time points based on a number of cache misses.

5. The method according to claim 1, wherein the execution address and the number of execution instructions are acquired by sampling at the plurality of time points based on a number of execution instructions.

6. An information processing apparatus comprising:
    a memory; and
    a processor coupled to the memory and configured to
    calculate a percentage of an instruction belonging to a certain instruction type among instruction types included in a block, the block being one of a plurality of blocks partitioned from a program;
    extract an execution address and a number of execution instructions from an arithmetic processing unit that executes the program and performs sampling of the execution address and the number of execution instructions at a plurality of time points, the number of execution instructions indicating number of instructions executed after precedent time point among the plurality of time points;
    calculate a first execution frequency of the instruction included in the block in each of the plurality of blocks based on the extracted execution address and the number of execution instructions;
    calculate a second execution frequency of the instruction belonging to the instruction type by multiplying the first execution frequency of the block by the percentage of the instruction in the block;
    calculate total number of second execution frequencies calculated for each of the plurality of blocks; and
    store the calculated total number of the second execution frequencies to the memory.

7. The information processing apparatus according to claim 6, wherein the plurality of blocks is a plurality of basic blocks, each of the basic blocks includes a branch instruction as a last instruction.

8. The information processing apparatus according to claim 6, wherein the execution address and the number of execution instructions are acquired by sampling at the plurality of time points based on a number of cycles.

9. The information processing apparatus according to claim 6, wherein the execution address and the number of execution instructions are acquired by sampling at the plurality of time points based on a number of cache misses.

10. The information processing apparatus according to claim 6, wherein the execution address and the number of execution instructions are acquired by sampling at the plurality of time points based on a number of execution instructions.

11. The information processing apparatus according to claim 6, wherein the processor is further configured to perform operation of the arithmetic processing unit.

12. A system comprising:
    the information processing apparatus according to claim 6, and a second information processing apparatus which includes the arithmetic processing unit.

13. A non-transitory computer readable medium having stored therein a program that causes a computer to execute a process, the process comprising:

calculating a percentage of an instruction belonging to a certain instruction type among instruction types included in a block, the block being one of a plurality of blocks partitioned from a program;

extracting an execution address and a number of execution instructions from an arithmetic processing unit that executes the program and performs sampling of the execution address and the number of execution instructions at a plurality of time points, the number of execution instructions indicating number of instructions executed after precedent time point among the plurality of time points;

calculating a first execution frequency of the instruction included in the block in each of the plurality of blocks based on the extracted execution address and the number of execution instructions;

calculating a second execution frequency of the instruction belonging to the instruction type by multiplying the first execution frequency of the block by the percentage of the instruction in the block;

calculating total number of second execution frequencies calculated for each of the plurality of blocks; and storing the calculated total number of the second execution frequencies to a memory.

14. The non-transitory computer readable medium according to claim 13, wherein
the plurality of blocks is a plurality of basic blocks, each of the basic blocks includes a branch instruction as a last instruction.

15. The non-transitory computer readable medium according to claim 13, wherein
the execution address and the number of execution instructions are acquired by sampling at the plurality of time points based on a number of cycles.

16. The non-transitory computer readable medium according to claim 13, wherein
the execution address and the number of execution instructions are acquired by sampling at the plurality of time points based on a number of cache misses.

17. The non-transitory computer readable medium according to claim 13, wherein
the execution address and the number of execution instructions are acquired by sampling at the plurality of time points based on a number of execution instructions.

18. The non-transitory computer readable medium according to claim 13, wherein the process further comprising:
executing the program; and
performing sampling of the execution address and the number of execution instructions at a plurality of time points.

* * * * *